ID [19]

United States Patent

Rivers, Jr.

[11] Patent Number: 4,973,430

[45] Date of Patent: Nov. 27, 1990

[54] CONTINUOUS HYDROGENATION OF UNSATURATED OILS

[76] Inventor: Jacob B. Rivers, Jr., 2801 NW. Expressway, Ste. 125, Oklahoma City, Okla. 73112

[21] Appl. No.: 404,332

[22] Filed: Sep. 7, 1989

Related U.S. Application Data

[63] Continuation of Ser. No. 891,771, Jul. 30, 1986, Pat. No. 4,871,485, which is a continuation-in-part of Ser. No. 540,037, Oct. 7, 1983, Pat. No. 4,613,410, and a continuation-in-part of Ser. No. 719,220, Apr. 2, 1985, Pat. No. 4,623,489.

[51] Int. Cl.$^5$ ................................................ C11C 3/12
[52] U.S. Cl. ................................. 260/409; 260/410.7; 260/420; 426/417
[58] Field of Search ...................... 260/409, 410.7, 420; 426/417

[56] References Cited

U.S. PATENT DOCUMENTS

| | | | |
|---|---|---|---|
| 2,520,422 | 8/1950 | Mills et al. | 260/409 |
| 2,520,423 | 8/1950 | Mills et al. | 260/409 |
| 2,520,425 | 8/1950 | Mills | 260/409 |
| 2,521,602 | 9/1950 | Potts et al. | 260/409 |
| 2,536,603 | 1/1951 | Holmboe | 260/409 X |
| 3,634,471 | 1/1972 | Kehse | 260/409 |
| 3,782,904 | 1/1974 | Fletcher | 260/409 X |
| 3,792,067 | 2/1974 | Coombes et al. | 260/409 |
| 4,155,924 | 5/1979 | Landis | 260/409 |
| 4,158,665 | 6/1979 | Hasman | 260/409 |
| 4,307,026 | 12/1981 | Kuiper | 260/409 |
| 4,326,932 | 4/1982 | Froling et al. | 260/409 X |
| 4,385,001 | 5/1983 | Rosen | 260/409 |

*Primary Examiner*—Werren B. Lone
*Assistant Examiner*—Vera C. Clarke
*Attorney, Agent, or Firm*—Bill D. McCarthy

[57] ABSTRACT

Improvements in determining and controlling a continuous hydrogenation process comprising the obtaining of viscosity operating curves and opacity operating curves for comparison to known hydrogen unsaturation curves and plasticity characteristics. With improved hydrogenation equipment for carrying out the continuous hydrogenation reaction in combination with deodorization and auto-oxidation prevention stations, the present invention provides an overall process and controls for precision hydrogenation of edible oils.

11 Claims, 10 Drawing Sheets

CONTINUOUS HYDROGENATION OF UNSATURATED OILS

CROSS REFERENCE TO RELATED APPLICATION

This is continuation application to U.S. Ser. No. 891,771, now U.S. Pat. No. 4,871,485, entitled CONTINUOUS HYDROGENATION OF UNSATURATED OILS, filed July 30, 1986 which is continuation-in-part to U.S. Ser. No. 540,037, now U.S. Pat. No. 4,613,410, entitled METHODS FOR DYNAMICALLY REFINING AND DEODORIZING FATS AND OILS, filed Oct. 7, 1983; and U.S. Ser. No. 719,220, now U.S. 4,623,489, entitled METHOD OF REFINING EDIBLE OIL FOR PREVENTING AUTO-OXIDATION OF THE OIL, filed Apr. 2, 1985.

BACKGROUND OF INVENTION

1. Field of the Invention

The present invention relates generally to the field of hydrogenation processes, and more articularly but not by way of limitation, to methods and apparatus for improved control and processing of a continuous hydrogenation reaction for unsaturated oils.

2. Discussion

The process of hydrogenation, as practiced on feedstocks of small grain, edible oils, has made a wide variety of products available which were formerly made exclusively from animal fats and oils. Hydrogenation has thusly taken on great economic importance as it has been utilized to make highly popular, healthful food substances available to the world's population. While its utility in the production of plastic products has long been known, hydrogenation has also become very beneficial in its provision of highly unsaturated oils having greater stability from oxidation.

There are two limiting factors that must be considered when dealing with hydrogenation, with these factors dependent upon the desired character of the finished product and the nature of the oil feedstock utilized in the hydrogenation process. The first factor to be considered is the degree and kind of isomerization desired for the finished product. It turns out that there is a direct correlation between the amount of trans-isomerization produced and the degree of plasticity of most oils at a given congealing temperature. While the term plasticity is used herein, it is recognized that this attribute is also sometimes referred to as the hardening characteristic of an oil. It is measured by the Solid Fat Index, a parameter measured by testing protocol established by the American Oil Chemists Society Method No. Cd 10-57.

The second of these process factors is the degree of hydrogenation. The propensity of the polyunsaturated oil to bond with hydrogen is measured with a titration called the Iodine Value of the oil. As hydrogenation proceeds, double bonds of unsaturated components of the feedstock oil are replaced with hydrogen to form ethylene groups, thus lowering the level of unsaturation. The function of hydrogenation, in addition to reducing the degree of unsaturation, should also be to selectively hydrogenate trienes and dienes without the process going to complete saturation. Hence, it is desirable that hydrogenation be carried on under conditions having favorable Selectivity Ratios. High Selectivity Ratios are preferable for the reason that a process can be stopped or limited more accurately with the greatest or desired level of monoenes achieved. The degree of unsaturation—the Iodine Value—is measured by the testing protocol of the American Oil Chemists Society Method No. Cd 1-15. This time consuming procedure provides a time delayed process measurement which is unsuitable for continuous hydrogenation control.

Equipment and procedures for the continuous hydrogenation of edible oils to provide true flexibility in the control of the amount of, and selectivity of, hydrogenation and the control of the degree of transisomerization, does not exist today. In order that a feedstock oil be hydrogenated so as to produce a tailored product having predetermined characteristics, one must be able to control the degree of isomerization while simultaneously obtaining a suitable Selectivity Ratio and degree of hydrogenation, and further, be able to identify and control these factors while the process is continuing. The equipment required for continuously hydrogenating small grain edible oils must have the ability to measure the product quality changes that are occurring within the process equipment, as well as to predict the final quality of the product produced. Such equipment must also have the ability to make measurements on the controlling parameters of the process to achieve optimal performance of the process equipment. That is, there is a need to obtain measurements representing the quality profile of the product as well as to obtain measurements that are utilized to control the process dynamics.

While no prior art hydrogenation process has achieved the above stated control of continuous hydrogenation, there are some that have made claim to continuous hydrogenation of unsaturated oils, such as Mills et al. U.S. Pat. No. 2,520,425 issued Aug. 29, 1950 and companion U.S. Pat. No. 2,520,422 and 2,520,423 issued on even date therewith. The continuous hydrogenator of Mills et al. features a vertically extending central shaft with horizontally extending agitator blades meshing with spatially disposed stator blades which are designed to shear the rising processing fluid as same is caused to pass around multiple stator blades. However, since the fluid is a slurry of oil and suspended catalyst, the centrifugal force imparted to the mixture stratifies the mixture so that there exists a near vacant conduit which permits the passage of unreacted hydrogen up and along the rotating shaft; this is especially evident when one considers the rotational speeds suggested by Mills et al. up to 1000 rotations per minute. Mills et al. uses only standard quality measurements, such as Iodine Values, and does not present any teaching of dynamic testing; accordingly the continuous hydrogenation processes taught by these prior art patents are of limited use and have not gained widespread acceptance.

U.S. Pat. No. 3,792,067, issued to Coombes et al. on Feb. 12, 1974, taught a process for continuous hydrogenation of fatty oils wherein an oil and dispersed catalyst mixture is passed through a pipeline reactor. Hydrogen is introduced at spaced intervals along the length of the reactor. Coombes et al. maintains two-phase flow and relies on fluid turbulence alone for agitation.

U.S. Pat. No. 3,634,471, issued to Kehse on Jan. 11, 1972, taught a method for continuous hydrogenation of oils and fats in which the oil is caused to flow over horizontally extending perforated plates. Hydrogen, generated by an electrolyzer, is passed upwardly through the oil which is caused to flow in a determined depth horizontally over the trays as it overflows each tray to move from top to bottom in the hydrogenator. Cooling is effected by cooling pipes arranged to contact the outside wall of the hydrogenator. Hydrogen production is responsive to vessel pressure, and thus Kehse claims that such corresponds to the concurrent consumption of hydrogen gas in the hydrogenator vessel.

SUMMARY OF THE INVENTION

The present invention provides for improved hydrogenation apparatus and methods to achieve a high degree of quality control of the effluent product from hydrogenation vessels. More specifically, the present invention provides for determining and controlling the hydrogenation quality of a continuous and uniform flow oil stream which is being hydrogenated, comprising passing a first portion of the processing stream through a plurality of viscosity monitors at a predetermined flow rate, cooling the first portion and measuring the viscosity at discreet temperatures, preparing a viscosity operating curve of viscosities versus temperatures, and comparing this curve to viscosity reference curves prepared with the subject oil which the unsaturation is known (as measured by the Iodine Value titration). This comparison affords near instanteous process information for altering selected parameters to effect adjustment to the stages producing the oil quality of the hydrogenator effluent.

A second portion of the processing oil is passed through a plurality of opacity monitors at a predetermined flow rate, and the temperature of the second portion of oil is selectively altered. Attenuation of high frequency radiation through the oil is measured at discrete temperatures, and an opacity operating curve of attenuation measurements versus temperatures is prepared both as the temperature is decreased and then as the temperature is increased; a mean working curve is generated, which is then compared with reference curves prepared with the subject oil on which plastic characteristics are known (as measured by the Solid Fat Index). As above, this comparison affords near instantaneous process information for altering the stages of the hydrogenation process to effect desired plasticity quality of the effluent oil.

Additionally, an improved hydrogenation vessel is presented which is comprised of a vessel having liquid inlet and outlet openings disposed such that a liquid zone extending a selected portion of the vessel's vertical dimension is provided; a rotatable support shaft extending centrally to the vessel interior; plural stationary liquid holding trays supported by the vessel internal wall; plural rotating trays supported by the support shaft, the stationary and rotating trays horizontally disposed between and in spaced apart relationship to each other; and a power assembly which imparts rotation to the support shaft. Plural stator and paddle blade members extend from the stationary and rotating trays, respectively, and meshingly engage to agitate the processing oil, which is caused to alternatively pass between the support shaft and the internal wall of the vessel on its route upwardly toward the outlet opening of the vessel. Gas sparger nozzles are provided to inject hydrogen at selected points in the vessel.

An object of the present invention is to provide an improved method of determining and controlling the stages of the hydrogenation quality of an oil subjected to hydrogenation reaction.

Another object of the present invention is to provide an improved hydrogenation vessel for the continuous hydrogenation of an unsaturated oil.

Yet another object of the present invention is to provide an improved hydrogenation process which is continuous in nature and which is integrated with other oil processes required to prepare edible oils from unsaturated oils, such other processes including, for example, degumming and deodorization.

One other object of the present invention is to provide a more economical and energy efficient method and apparatus for the continuous hydrogenation of an unsaturated oil, while minimizing the capital investment required to achieve a specified capacity.

Other objects, advantages and features of the present invention will become clear from the following description when read in conjunction with the drawings and appended claims.

DISCUSSION

Figure 1:
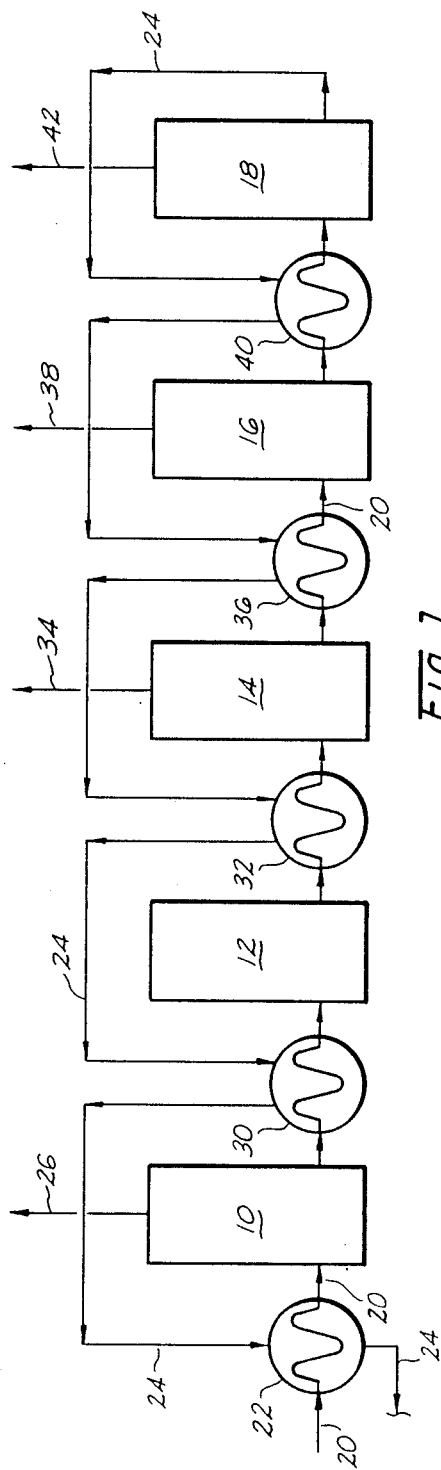
FIGS. 1 and 1A are schematical depictions of an overall coupling of processes and apparatus stations incorporating the present invention.

The present invention provides a method for continuously determining an indirect equivalent for the Iodine Value of edible oil in the stages of a continuous hydrogenation process. The invention makes special measurements of viscosity and relates such measurements to local temperatures of the processing oil. In essence, the invention deals with the exaggeration of one of the parameters of Poiseuille's Kinematic Viscosity relationship, such that precise indirect measurements of process parameters can be achieved to obtain real differentials that are great enough to provide functional utility in predicting ongoing and dynamic quality characteristics of the stages of the processing oil. This will become more clear below, but in essence, the indirect measurement is used to estimate the Iodine Value of the processing oil, but the Iodine Value per se is not measured, except as required to calibrate the viscosity measuring instrument.

Thus, real and measurable data replace indistinguishable and unreliable differentials of the prior art, such as the Refractive Index differentials used in the continuous hydrogenation process of U.S. Pat. No. 2,520,422, issued to Mills et al. In practice, measurements of the Iodine Value of a processing oil to provide Refractive Index differentials usually yield differentials in the magnitude of 0.002 to 0.008 units between unhydrogenated oil and fully hydrogenated oil. Even if one were to make an electronic expansion of these minute differentials, they are not thereby made reliable to determine the progression of hydrogenation of the oil. In contradistinction thereto, the present invention uses exaggerated pressure differentials with real measurable data which are analogous to the degree of hydrogenation change, thereby permitting accurate monitoring of the progression of the hydrogenation process. For example, it has been found that, in the method and apparatus described hereinbelow, a drop in the Iodine Value from 135 to 120 will give a pressure differential of about 25.0 psig. When using instruments which measure to a precision of 0.3 psig, this becomes a highly precise measurement. Hence, the present invention provides a vast improvement in the accurate measurement of process progression in the hydrogenation of edible oils and fats, and these real measurable differentials provide a new dimension in the technology of controlling continuous hydrogenation processes.

By dealing with real physical differentials, product quality measurements can be done instantly upon increments of the processing oil. In contrast, the Iodine Value test is time consuming, and is generally so tardy as to be unusable for controlling a continuous hydrogenation process. This is probably the leading reason that continuous hydrogenation has not found widespread usage in the edible oils industry. Pertinent data on the condition of the process are so lagged that control and adjustment of the continuous hydrogenation process has, heretofore, been incapable of achieving acceptable integrity. It is not surprising, then, that this industry has been almost entirely dependent upon batch hydrogenation processes.

Poiseuille's kinematic viscosity measurement is given in the following relation:

$$\eta = \frac{\pi DR}{8Lw} \quad (1)$$

In the formula (1) given above, D stands for the differential pressure across a measuring interstice; R represents the inside radius of the interstice; L is the length of the interstice; and w is the flow rate of the liquid through the interstice. The use of this relationship will become clear as the present invention is illustrated hereinbelow.

In the control technique of the present invention, several temperatures are selected to obtain data on the degree of hydrogenation achieved within the process. When the technique is applied to fats and oils which have no crystalline structure, the relationship between the viscosity measurement and the Iodine Value has been found to be very close. Hence, the measurement of differential pressures, divided by the flow of fluid, across a series of intestices at various temperatures—temperatures at which the oil produces no crystals—provides a means for excellent indirect equivalents to the Iodine Values. If the pressure differentials of these same oils and fats are measured in like manner at lower temperatures—at which crystals do form—the technique provides one means for determining the plastic characteristics of the stages producing finished products. Hence, as will become more clear hereinbelow, a family of curves for an upper temperature range, at which no crystallization occurs, and a family of curves at a lower temperature range through which finite crystallization does occur, can be coordinated in a useful manner. As the crystallization of the oil is a function of time, two types of curve families are generated depending upon the direction of the temperature change.

The other indirect process measurement mentioned above involves the selection of a process parameter which augments the above described lower temperature measurements; that is, the plastic properties of the processing oil can further be determined by a special manner of utilizing the "Opacity Index" of the oil. As with the viscosity measurement, this involves comparisons of certain oil characteristics at various temperatures, as it has been discovered that these characteristics have special pertinence at the point at which crystallization begins to occur. This is, as will be recognized, a direct measurement of the rate of crystallization progression, which continues to increase as the temperature is lowered on the oil. It is more sophisticated than the commonly measured "cloud point"; that is, the present invention deals with much more sensitive and comprehensive measurements, picking up changes which are invisible to the naked eye by the use of infrared light, or other high frequency wave energies, to distinguish discrete differences in the opaque oil.

This plasticity test is analogous to the Solid Fat Index mentioned above. The relation of the Opacity Index to temperature change can be displayed on a computer screen, and a family of curves—representing various predictable conditions of the process stages (for specific end products)—affords operator indicies for process control in the manner described more fully below. This technique provides near instantaneous information on the progression of the change of the plastic characteristics of the processing oil. As the Iodine Value is used to calibrate the earlier mentioned viscosity measurement, the Solid Fat Index is used to calibrate the Opacity Index measurement.

It should be noted that the formation of crystals in oils is not solely a function of temperature, as the Solid Fat Index cannot be measured in a short period of time. Likewise, the Opacity Index proves to be time dependent as well as temperature dependent, and a compensatory procedure accounting for this time dependency has given excellent results. By accounting for the lag time of crystal formation as the temperature of the measurement sample is descending, and taking into consideration the lag time for crystal melting as the temperature of the oil sample ascends, two curves are established for Opacity Index and temperature values, and these can be integrated to provide a working curve analogous to the Solid Fat Index. This integration can be measured on the working sample virtually simultaneously with the process flow, thereby providing excellent process control parameters within the objects of the present invention.

There are two ways that are presently known for the utilization of the measurement techniques of the present invention to control a process in which an oil is hydrogenated. The first such application is to establish a set of temperature points (fairly constant temperature control is desired, although not critical) for the sample of processing oil to be tested. The oil sample is cooled, several values of the Opacity Index values are obtained at various temperatures, and computer generated reference curves of the type mentioned above are produced. Electronically, these curves are integrated into a mean single curve which compensates for the lag between the arrival at a given temperature and its respective Opacity Index. The resultant curve has compensation for the time of crystallization and produces a nearly instantaneous curve reflecting information analogous to the Solid Fat Index. These measurements are taken in conjunction with viscosity measurements, and the two operating curves, when compared to the stardardized reference curves, provide nearly instantaneous process data.

The second known wa of implementing the control techniques of the present invention involves taking a small grab sample of the processing oil and refluxing it through a heat exchanger to make the opacity and temperature measurements both down through and back up through its crystallization zone. This method develops two smooth curves which can be computer integrated into a single curve yielding information analogous to the Solid Fat Index. This method is not the preferable approach since its results are not as timely to the hydrogenation process.

The preferred embodiment of the present invention will be described hereinbelow with reference to the drawings, and certain definitions of the terminology employed and of the concepts involved should prove helpful. Tray volume is the mixture of oil, hydrogen and catalyst contained between two adjacent trays. A compartment volume defines a repetition of the process and is made up of a plurality of tray volumes. A compartment volume may consist of as few as two tray volumes. It is in each of the compartment volumes where the added ingredients are repeated in relation to the composition of the stream.

Hydrogen gas spargers are employed to create hydrogen solutions between the limits of a hydrogen abundant condition and a hydrogen starved condition within each compartment volume of each hydrogenator column. A hydrogenator column is a vessel having plural compartment volumes with overall liquid and pressure containment of the unit process.

In the present disclosure, uniquely designed hydrogenator vessels are presented which provide extended residence time to the undissolved hydrogen gas within the body of each vessel without slowing or inhibiting the flow throughput. For the purpose of understanding the operation of the unique hydrogenation process of the present invention, three velocities should be considered, as follows:

(1) The velocity of the oil crossing the static tray between the edge of the tray and the rotating shaft: $V_1 = Q/A_1$ ($V_{max}$), where Q is the flow rate and $A_1$ is the open area between the inner edge of the static tray and the rotating shaft;

(2) The velocity of the oil passing the tray weir between the weir and the hydrogenator vessel wall: $V_2 = Q/A_2$ ($V_{minimum}$); and (3) The velocity crossing the static tray weir between the weir and the rotating tray: $V_3 = Q/A_3$ ($V_{intermediate}$)

The above expressions consider a compartment volume of two tray volumes. With this description the amount of hydrogen dissolved into the oil between the maximum specific volume and the minimum specific volume is: $(v_{max} - v_{min})$ Q.

Since the specific volume is a function of the amount of hydrogen entrained, the specific volume will decrease as the hydrogen gas dissolves into the oil as the process progresses within the respective compartment volume. It will be at its highest rate at the beginning of the compartment volume and will be uniform at this point as the hydrogen is injected at a point of its highest velocity ($V_j$) where good mixing occurs.

As the horizontal component of the flow slows with the progression of the oil into increasingly larger cross-sectional areas of the sector of the tray volume, the mixture begins to stratify with greater portions of higher specific volumes being buoyed upwardly into the contained volume of the underside of the respective trays. Composition of the mixture is equitably distributed into the respective sectors by partitions on the upper sides of the rotating trays. The partitions, which also act as stiffeners for the rotating trays, divide the mixture from the hydrogen sparger into the oil's highest velocity ($V_j$) into the sector volumes.

The above discussion of velocities and specific volumes are offered so that other velocities and specific volumes, now discussed, will have discrete meanings. The above velocities and specific volumes are not equivalent to those implied in the Mills patents (U.S. Pat. No. 2,520,423) and in the Coombes et al. patent (U.S. Pat. No. 3,792,067), and are among the several differences of the present invention to that of the prior art. As described more fully below, in the present invention, agitators, impellers and stators are mounted vertically onto rotating and static trays and mate geometrically so that mechanical displacement provides a shearing force to the oil contained in the tray volume. The agitators are angularly disposed so as to impart vertical displacement to the oil into the undissolved hydrogen rich volume at the underside of the next above tray.

This vertical displacement capability is designed into the agitators and stators in recognition of the stratifying propensity of the entrained undissolve hydrogen in the higher specific volumes buoyed up onto the underside of the respective trays. The relative lateral placement between the agitators and the stators also provides dynamic shear to the fluid containing the just released hydrogen bubbles which are immediately reduced in size by this shearing action. Superior agitation (vertical high velocities in addition to those described above) is applied to the mixture without increasing the throughput velocities $V_1$, $V_2$ and $V_3$. In other words, the agitators are able to apply shearing work preferentially to the hydrogen rich volumes entrapped on the underside of the trays. Hence, the oil containing hydrogen and catalyst is given momentary residence in its incremental tray volume in which it is given violent work in both the shearing and the vertical directions. This technique offers a method for maintaining near saturation conditions of the hydrogen in the oil as desired at all points in the hydrogenation process. It also adds interface between the surfaces of the catalyst, the dissolved hydrogen and the oil to accelerate either the rate of hydrogenation or the rate of trans-isomerization.

The amount of hydrogen in solution in an incrementally small volume of oil depends upon its reaction rate and the rate of returning hydrogen into solution. If an incrementally small volume of oil has reacted with all of its available hydrogen, whatever happens thereafter (if anything) will be isomerization due to the energy levels (pressure, velocity and internal) and the potential of the catalyst. Hydrogen can go into solution with the oil only at the surface of a hydrogen bubble. If the ratio of the surface of the hydrogen bubble to the bubble's mass is greatly exaggerated, the rate of dissolving the hydrogen into the oil can be greatly accelerated.

Hence, the smallest radii of bubble spheres will produce the highest ratio and the fastest solution rate in accordance with the following relationships:

$$\frac{SURFACE}{MASS} = \frac{3v}{r} = \frac{2201T}{rp} \quad (2)$$

$$v = \frac{767T}{p} \quad (3)$$

where $v$=the specific volume of hydrogen gas at a particular absolute pressure (p) and a particular absolute temperature (T); and where $r$=the average radius of spherical bubbles of hydrogen gas.

As the radius of the average bubble approaches zero, as is the case where the hydrogen bubbles are repeatedly and nearly completely sheared into extremely small sizes by the configuration of the stators and agitators, the ratio becomes infinite and the solution rate approaches an instantaneous condition, provided sufficient hydrogen is available in the proximity of the incrementally small volume of oil and this volume is not saturated with hydrogen. Therefore, by dynamically shearing the mixture of the hydrogen gas and oil, the bubbles are reduced in size and the rate of dissolving the hydrogen is greatly increased.

Uniform rates of reaction are necessary throughout the equipment if a uniform and homogeneous product is to be produced. The final quality of the oil product is dependent not only upon how much and how fast hydrogenation takes place, but it is also dependent upon how much isomerization (both cis and trans forms) takes place. For true control of the process, the composition of the mixture must be quite similar in all incrementally small volumes. In a process which is relatively hydrogen abundant in its beginning and which is relatively hydrogen starved at its end, Selectivity Ratio prediction and control are not possible, and consequently, it is not possible to achieve a uniform and homogeneous product.

In the hydrogenation vessels to be described below, finite volumes of interacting oil, catalyst and hydrogen are disposed between the respective trays, for which the residence of the mixture in a tray volume may be determined by $dV/Q=t$, where d is the density, V is the tray volume and Q is the flow. This provides a determined amount of the mixture to permit shaft work to shear the hydrogen bubbles into smaller and smaller sizes while simultaneously providing the necessary residency for the hydrogen to go into solution.

Since the present invention involves the continuous hydrogenation of edible oils, all ancillary flows are likewise continuous so that reactant mixtures are uniform and equally distributed during the process. The input hydrogen must be maintained at a very high purity and remain air and oxygen free. This also applies to the catalyst employed since catalyst strength is an important process consideration and care must be taken to preserve the integrity of the catalyst if the process control is to be maximized. The effects of catalyst poisoning are generally less for continuous hydrogenation as compared with batch hydrogenation, so timely replacement of the catalyst is not a cost increasing factor.

As will become clear below, the present invention provides for "dead end hydrogenation", that is, nearly all of the hydrogen introduced into the system dissolves into the oil. Conventional batch type hydrogenation will always be control limited and quality inferior as it will have some incrementally small volumes in an hydrogen abundant condition and some incrementally small volumes in an hydrogen starved condition, all at the same time. It is virtually impossible to have uniform reaction rates throughout a large fluid body. Hence, non-uniformity in hydrogenation and non-uniformity in isomerization are both experienced in batch hydrogenation. With the disclosed invention, these conditions are prevented and a uniform and predictable product is forthcoming.

In the present invention, dead end hydrogenation is possible regardless of whether the system is being operated at limits near an hydrogen abundant condition or at limits near an hydrogen starved condition. With dead end hydrogenation, there is no recirculation of the hydrogen gas. There is, however, a sight vapor flow leaving the freeboard volume to exhaust the produced vapors such as ether, carbon dioxide and other unwanted vapors.

As stated earlier, the amount of hydrogen consumed per unit time has analogy with the amount of heat produced and is relative to the rate of the hydrogenation reaction. Likewise, as different degrees of desired isomerization are developed, different operating pressures are needed, and the amount of excess hydrogen gas retained in the freeboard volume of the hydrogenator may not be sufficient to maintain suitable pressures and at the same time exhaust all of the undesirable vapors for all operating conditions. Hence, a different method for pressure flexibility is provided. The freeboard volume above the liquid phase of the present hydrogenator has a vapor agitator which keeps produced vapors and hydrogen gas well mixed so the freeboard volume does not become stratified and flow out hydrogen gas only. The hydrogenator is provided with an ancillary nitrogen flow into the freeboard volume to maintain the desired pressures and sufficient excess flow to carry away any produced vapors. The nitrogen is introduced above the liquid phase and away from the flow leaving through the back-pressure valve. These conditions will occur when very small amounts of hydrogen are being dissolved into the oil.

The measurement of the algebraic summation of input hydrogen flow and the output hydrogen flow can be made to confirm the rate of reaction of hydrogenation with this indirect measurement. Hence, three process control measurements are made: (1) differential of hydrogen flow in and hydrogen flow out; (2) temperature gradient on the oil up the hydrogenator column; and (3) total heat leaving the system from each hydrogenator vessel. These three measurements provide adjustment information for the operator.

The hydrogenation process is exothermic, and for uniformity of process conditions, cooling must be provided. As with other parameters of the present process, heat flow should be held to a uniform condition or a desired gradient condition. As described more fully below, stator trays have internal sinuous cooling coils, with the static agitators acting as surface extenders flowing the heat into the static panel coil of the tray itself. Approach temperatures are thusly repetitive within each tray volume so that the temperature in each small incremental volume is discretely controlled.

The heat generated within a given hydrogenator vessel is an indirect indication of the amount of hydrogen reacted, so the temperature differential of the coolant in and out of the hydrogenator vessel can be measured against the flow of the coolant; this heat removal measurement can be recorded and maintained at a uniform rate. Likewise, the temperature gradient of the oil can be recorded for observation by the operator, and the temperature gradient of the oil can be made uniform by adjusting the coolant flow. With reference to the temperature gradient of the oil passing through the hydrogenator column, it may be that a zero temperature gradient is desired, and this function controls the change of the temperature of the oil as it passes from one compartment volume to another. As experience is gained with the process, adjustment of the process parameters can be made to produce the multitude of oil products with data such as the oil temperature gradient.

Two methods can be employed to control the hydrogen flow to each compartment volume, singularly or in combination with each other, to maintain desired control between the two limits of the hydrogen abundant condition and the hydrogen starved condition. As the process condition approaches hydrogen starvation, no static pressure compensation is necessary as the static pressure upon the hydrogen gas is extremely high, and the static pressure differential between the bottom of the hydrogenator column and its top is small. Hence, the flow of the hydrogen gas will be essentially the same between each of the compartment volumes. When the process condition approaches hydrogen abundancy, the static pressure flowing the hydrogen gas is relatively low, and the upper compartment volumes will receive the flow with the lower compartment volumes receiving none. Hence, hydrogen gas flow compensation, based upon temperature, will be necessary.

A description of the preferred embodiment of the equipment to carry out the improved hydrogenation process of the present invention will now be given with reference to the various drawings included herewith. Identical numerals will appear in the drawings to indicate equipment and components that are identical in other figures, and for the sake of a more clear discussion of the necessary disclosure, a large amount of construction detail and process flow information, known to persons of ordinary skill in the art of hydrogenation processes, will be omitted. That is, it is not believed necessary to include details such as valving, vessel construction, piping, controls, etc., except as provided herein to instruct persons of ordinary skill as to how to make and use the present invention.

In the practice of the present hydrogenation process, it will be beneficial to practice same in continuous and coupled flow, either in partial flow or total flow, with the unique refining and deodorizing process taught in my above mentioned U.S. Pat. No. 4,613,410 and as modified by the teaching of my U.S. Pat. No. 4,623,489, also mentioned above. The teachings of those earlier patents are incorporated herein by reference so as to minimize the length of the present teaching. Nevertheless, certain portions of my earlier patent applications will be discussed here in the interest of clear understanding and reading continuity.

Figure 1A:
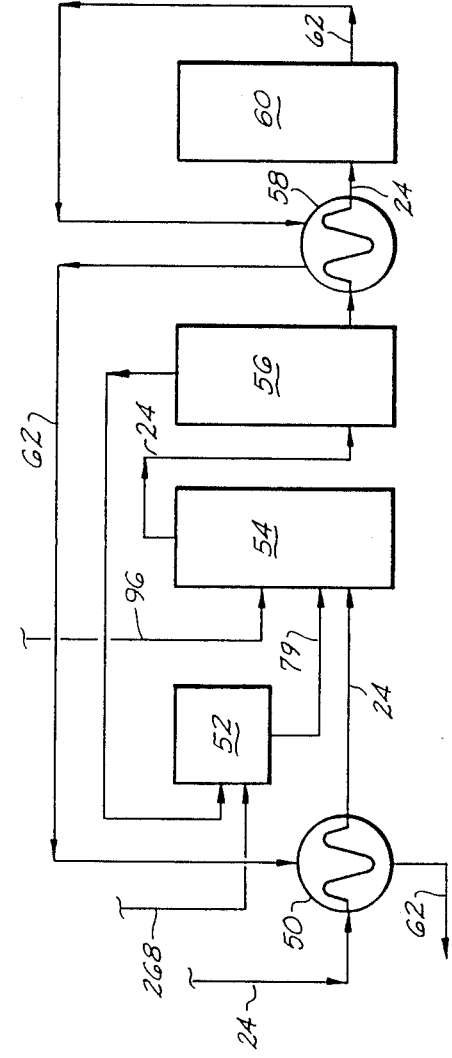

Referring to FIGS. 1 and 1A herein, the process and apparatus of the present invention is illustrated schematically, as is the process and apparatus of the aforementioned U.S Pat. No. 4,613,410. As was stated in the latter, the unique and complete refining and deordorizing process taught therein comprised degumming, deaerating, dehydrating, bleaching, low temperature refining, tocopherol distillation and fatty acid distillation (which is also referred to as deodorization), all of which occur simultaneously at five isothermal stations.

10 is an isothermal station in which degumming, dehydration and deaeration occur at approximately 110° F.

12 is an isothermal station at which bleaching occurs at approximately 230° F.

14 is an isothermal station at which refining distillation occurs at approximately 285° F. to remove ketones, aldehydes and other components.

16 is an isothermal station at which tocopherol distillation occurs at approximately 340° F. as measured at the top of the tocopherol rectifying column.

18 is an isothermal station at which fatty acid distillation, referred to as deodorization, occurs at approximately 410° F. These temperatures may vary widely depending upon optimum distillation conditions of the various types of oils.

Between each of the stations having a different temperature and at the beginning of the process is a heat exchanger which transfers heat energy from the finished oil to the unfinished oil moving into the next station. In this manner, an efficient use of the heat energy applied to the oil is obtained. After startup, assuming relatively well insulated equipment, relatively little heat energy is lost as waste heat. No significant amount of heating or cooling of oil or fat product is required throughout the process depicted by isothermal stations 10—18.

20 is an inlet metered oil stream.

22 is a heat exchanger.

24 is an outlet stream of finished product oil which flows in heat exchange relationship to the inlet oil stream 20 in the heat exchanger 22. The unfinished but now heated oil in stream 20 then enters isothermal station 10 for degumming, dehydration and deaeration.

26 is an effluent stream of water and air exiting isothermal station 10.

30, 32 are heat exchangers in which the unfinished oil stream 20 passes in heat exchange relation to the product oil stream 24. The unfinished oil stream 20, after leaving heat exchanger 30, enters the isothermal station 12 for bleaching.

Following bleaching, the unfinished oil stream 20 passes through heat exchanger 32 to enter isothermal station 14 for a relatively low temperature distillation to remove aldehydes, ketones, alcohols and those components boiling below the temperature, at certain static and velocity pressure conditions, for removal of tocopherol. That is, the isothermal station 14 removes all components which are more volatile, under these conditions, than tocopherol.

34 is an effluent stream of aldehydes, ketones, alcohols, etc. removed from the unfinished oil by isothermal station 14.

36 is another heat exchanger. The unfinished oil stream 20, leaving isothermal station 14, again passes in heat exchange relation to the product oil stream 24 via the heat exchanger 36 and then enters isothermal station 16 for distillation of tocopherol.

38 is an essentially pure effluent stream of tocopherol produced by isothermal station 16. This pure tocopherol is a valuable product produced by the inventive process of U.S. Pat. No. 4,613,410.

40 is another heat exchanger and serves to again pass the unfinished oil stream 20, following its exit from isothermal station 16, in heat exchanger relationship with the product oil stream 24. The oil stream 20 then enters the isothermal station 18 for distillation removal of free fatty acids.

42 is an effluent stream of free fatty acids removed from the unfinished oil by isothermal station 18. Preferably, the free fatty acid stream 42 is fractionated and condensed into one or more free fatty acid components.

The oil leaving the isothermal station 18, referred to as "finished oil" in U.S. Pat. No. 4,613,410, leaves the isothermal station 18 as product oil stream 24 to pass through heat exchangers 40, 36, 32, 30 and 22 to become the inlet stream to the process schematically depicted in FIG. 1A, which will be described more fully hereinbelow.

Meanwhile, it will be sufficient for the purpose of this teaching to note that each of the stations 10 through 18 is described in detail in my aforementioned U.S. Pat. No. 4,613,410 and U.S. Pat. No. 4,623,489 which are incorporated by reference herein to the extent necessary to understand the present invention and to meet the requirements with regard to forming a proper basis for claim coverage as may develop herein and during prosecution of same.

In FIG. 1A, the product oil stream 24 becomes the inlet feed stock and passes through several equipment components, as follows.

50 is an inlet heat exchanger;
52 is a catalyst storage and feeder station;
54 is a continuous hydrogenation station utilizing unique apparatus and control devices described fully hereinbelow;
56 is an oil-catalyst separator station;
58 is a heat exchanger; and
60 is another deodorizer station of the type discussed hereinabove with reference to FIG. 1.
62 is the final product stream of edible oil that has been properly hydrogenated to specification.

While the process depicted by the schematic of FIG. 1A will be described hereinbelow in sufficient detail to provide persons of ordinary skill that which will be necessary to practice the present invention, an overview of same may prove helpful. The product oil stream passes through the inlet heat exchanger 50 to capture most of the heat energy of the final product stream 62; enters the continuous hydrogenation station 54 together with catalyst from catalyst storage and feeder station 52 and is hydrogenated in a controlled, continuous manner; passes with its dispersed catalyst to oil-catalyst separator station 56 where the catalyst is separated and returned to catalyst storage and feeder station 52; passes through heat exchanger 58 in heat exchange relation to the output final product stream 62; and finally, passes to deodorization station 60.

The inlet heat exchanger 50 comprises one or more plate frame exchangers designed to extract as much heat energy as practical from the final product stream 62. By carefully designed approach temperature management, together with good use of vessel insulation, the present invention minimizes the loss of energy from waste heat.

The catalyst storage and feed station 52 comprises an old catalyst storage and an old catalyst feed station; these are two slurry feed tanks which receive the return portion of the catalyst from oil-catalyst separator 56, which will be described more fully.

The continuous hydrogenation station 54 will now be described with reference to FIGS. 2 through 10, as follows.

70 is a hydrogenation system constructed in accordance with the present invention.

Figure 2:
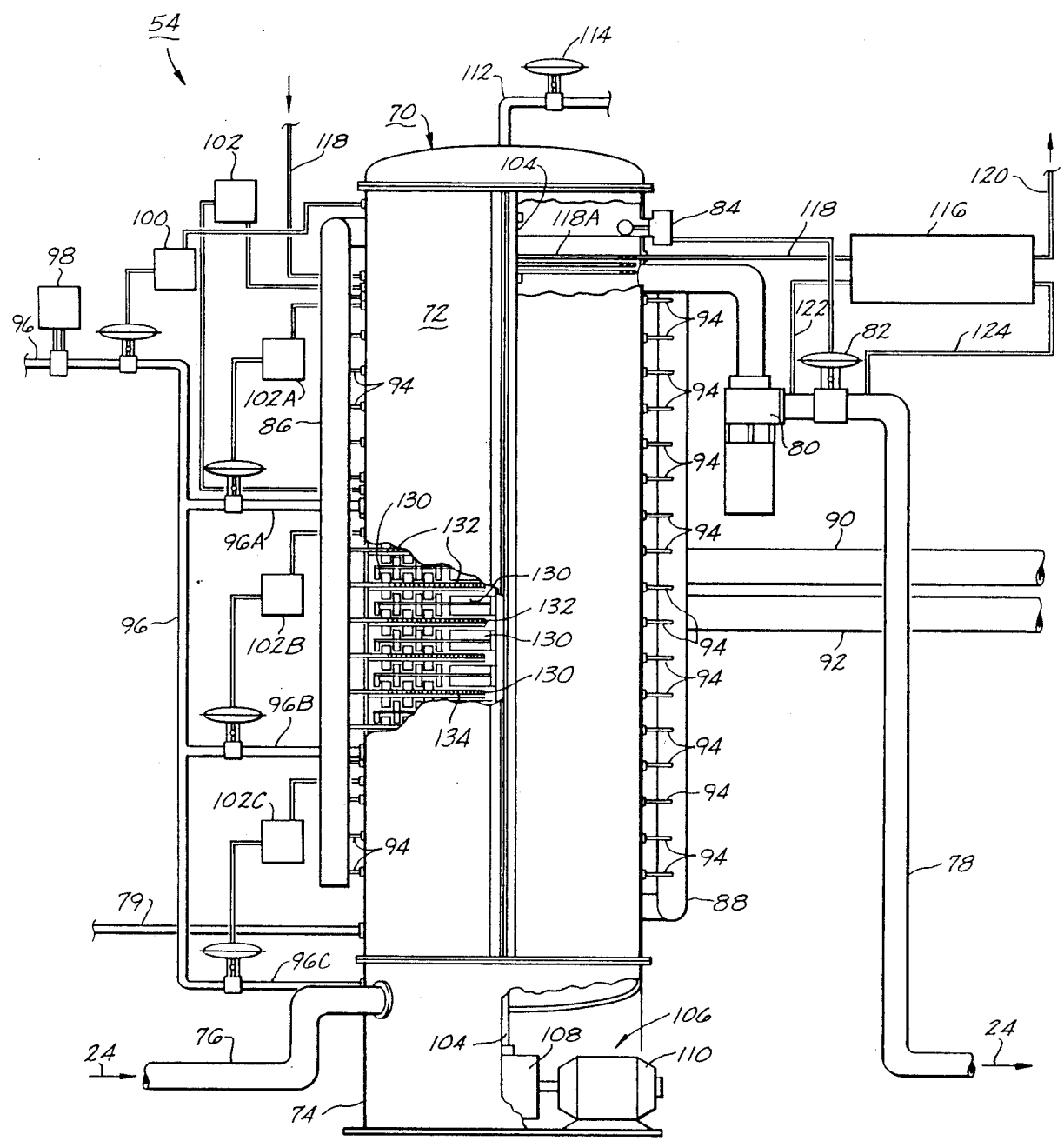
FIG. 2 an elevational side view in partial cutaway view of an hydrogenation station constructed in accordance with the present invention.

72 is a hydrogenator vessel, or column, which is the internal construction thereof. While only one hydrogenator vessel 72 is shown in FIG. 2, it will be understood that a battery of hydrogenators will be fluid linked so that the oil and other substances being processed will flow serially through each of the hydrogenators in known fashion. Further, it is known to provide such hydrogenator vessels in parallel flow where greater capacity is required, or where the hydrogenation system 70 needs to be partially or completely shut down for any reason, such as for maintenance. Of course, it is also known to provide bypass conduits and valving to each of the hydrogenator vessels 72 so that individual columns can be taken off line and returned to service without stopping the process. In FIG. 2:

74 is a base member upon which the hollow hydrogenator vessel 72 is supported.

76 is an inlet oil conduit communicating to the bottom of the hydrogenator vessel 72 from a source of fat or oil, such as the product oil stream 24 from FIG. 1A. For subsequent hydrogenator columns, the input oil will be that which has exited the preceding column or columns; that is, the product oil stream 24 is passed sequentially to the serially disposed hydrogenator columns following vessel 72.

78 is an outlet oil conduit which passes the product oil stream and catalyst (designated 26) to succeeding hydrogenator columns, or for the last such column, to other processing equipment.

79 is an inlet catalyst conduit by which a slurry mixture of new catalyst and old catalyst is passed into the bottom of the hydrogenator vessel 72 where the catalyst blends with the inlet processing oil to travel therewith sinuously upwardly over the rotating and stationary trays, described below, and exits via the outlet oil conduit 78.

80, 82 and 84 are, respectively, a pump, a flow control diaphragm valve and a liquid level control associated with the outlet oil conduit 78.

86, 88 are coolant header conduits supported along each side of the hydrogenator vessel 72.

90 is an inlet coolant conduit which communicates with the coolant header 86, and 92 is an outlet coolant conduit which communicates with the coolant header 88.

94 depicts a plurality of stub connector conduits which extend from each of the coolant header conduits 86, 88 and extend through the walls of the hydrogenator vessel 72 to pass a coolant from the inlet coolant conduit 90 through cooling coils, described below, and to discharge same to the outlet coolant conduit 92.

96 is an inlet hydrogen conduit which connects via several branches 96A, 96B, 96C to upper, middle and lower portions of the hydrogenator vessel 72. Internal hydrogen spargers, described below, are disposed to receive hydrogen from the conduits 96A, 96B and 96C to disperse the hydrogen into the internal hollow of the hydrogenator vessel 72.

98 is a flow control meter in the inlet hydrogen conduit 96 and can be a conventionally known pneumatic or electronic meter.

100 is a pressure control valve assembly interconnected between the inlet hydrogen conduit 96 and the hydrogenator vessel 72 which senses and controls the pressure in the freeboard space above the liquid phase contained in hydrogenator vessel 72 within predetermined pressure limits.

102 is an overall temperature sensing assembly, and 102A, 102B and 102C are temperatures sensing and control assemblies which serve to control the hydrogen flow via diaphragm valves, respectively, in the hydrogen conduits 96A, 96B and 96C. Conventional temperature probes (not shown), disposed at selected points in the hydrogenator vessel 72, provide temperature signals to the temperature sensing assembly 102.

The internal structure of the hydrogenator vessel 72 is quite unique and is as follows:

104 is a vertically disposed, rotatable support shaft which extends upwardly into the hydrogenator vessel 72 generally the length thereof as shown. Appropriate bearings, seals and supports (not shown) are provided as required to maintain the support shaft 104 in proper alignment for rotation within the hydrogenator vessel 72.

106 is a support shaft drive assembly comprising the following:

108 is a transmission unit connected to the lower end of the support shaft 104; and 110 is an electric motor coupled to the transmission 108.

112, 114 depict, respectively, an overhead exhaust vapor outlet conduit and a back pressure valve. While the hydrogenator vessel 72 incorporates dead end hydrogenation—its inlet hydrogen is almost entirely consumed in the continuous hydrogenation process occurring therein—there will be small amount of reaction vapors plus a very small amount of hydrogen exhausted from the vessel. A small amount of nitrogen through a nitrogen purger (not shown) may be fed to the freeboard volume to maintain pressure when the system is operated on a very starved hydrogen condition. The freeboard volumes of each vessel are stirred by the agitator (described below), so it should be understood that the nitrogen gas velocity does not serve the function of vapor agitation.

As noted hereinabove, the present invention provides for the continuous sampling and analyzing of extremely small side flows of the processing oil. This is achieved by the following:

116 is a continuous oil quality monitor station which will be described fully hereinbelow. Quality, as used herein, will refer to measurements which are analogous to real data of the Solid Fat Index and Iodine Values of the processing oils. That is, the desired quality for the end product made by the present inventive process will be expressed in terms of targeted values of he Solid Fat Index and the Iodine Value, and the measurements made by the quality monitor station 116, as described more fully below, provides means for having near instantaneous, and thus contemporaneous, data which gives excellent predictive control over the quality of the end product.

118 is a calibration sampling conduit which passes into the upper portion of the hydrogenator vessel 72, forms a coil 118A which is disposed below the level control 84, and passes again through the vessel wall to connect with the quality monitor station 116. Unhydrogenated oil of known unsaturation and plasticity is passed through the calibration sampling conduit 118, brought substantially to the vessel temperature, and passed to the quality monitor station 116.

120 is a sample return conduit which removes the sample of oil from the quality monitor station 116 and directs the discarded sampling stream back to an input point for remixing with the input oil charging the first hydrogenators (vessels 72).

122 is a oil sampling conduit which is in fluid communication with the outlet oil conduit 78 and with the quality monitor station 116.

124 is a sample return conduit through which the oil sample is returned to the outlet oil conduit 78.

The above discussion of the hydrogenation system 70 is sufficient, together with the descriptions of the internals of the hydrogenator vessel 72 and quality monitor station 116 which follow, to teach of its use in batteries of such hydrogenator vessels 72 to practice the continuous hydrogenation process of the present invention. That is, when a plurality of hydrogenator vessels 72 are disposed in interconnected assembly such that the processing oil is caused to pass sequentially from one hydrogenator vessel to another, the hydrogenation system 70 becomes an integrated process unit capable of achieving the goals and objects of the present invention.

Continuing the present description of the hydrogenator vessel 72, the cutaway drawing of FIG. 2 permits viewing of a portion of the plural trays that are supported therein. Alternate rotary and stationary trays are interdisposed in a fashion made more clear as this description proceeds. With regard to FIG. 2, shown therein are the following:

130 depicts a plurality of rotating trays that are supported by the support shaft 104.

132 depicts a plurality of stationary trays that are attached to, and supported by, the inner wall of the hydrogenator vessel 72.

134 (shown in FIG. 3) depicts plural coolant coils disposed within the stationary trays 132, commonly referred to as "tube in sheet construction". The coolant coils 134 are connected to the coolant header conduits 86 and 88 via the stub connectors 94 to pass a coolant delivered and returned by the coolant conduits 90 and 92, thereby providing regionally disposed cooling surfaces throughout the hydrogenator vessel 72 to remove the heat locally and uniformly from the exothermic reaction, thus controlling one of the parameters which determine the rate of this reaction.

Figure 3:
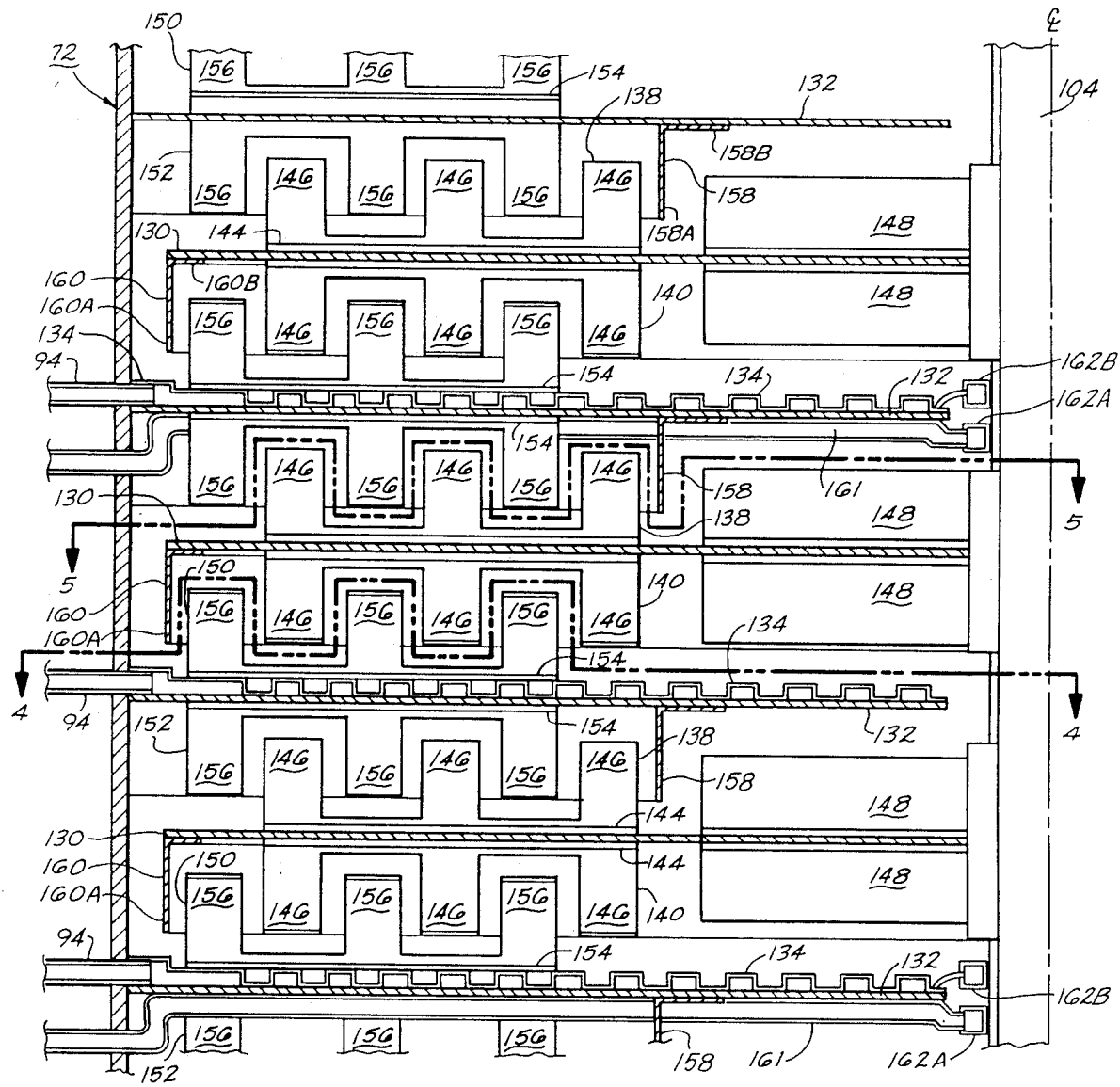
FIG. 3 is a side elevational, cross sectional view of a portion of the internal structure of the hydrogenation vessel shown in FIG. 2.

Turning to FIG. 3, shown therein, in partial detailed representation, is a segment of the internal construction of the hydrogenator vessel 72. Depicted are a portion of the wall of the hydrogenator vessel 72, a portion of the support shaft 104, several of the rotating trays 130 and several of the stationary trays 132. Also shown is one of the coolant coils 134 on each of the stationary trays 132, with the exception of the top one of the stationary trays shown therein, which is thusly displayed to more clearly show the construction of same. While only one such connector 94 is shown connected to each coolant coils 134 in FIG. 2, each such coolant coils 134 will have two of the stub connectors 94, with one such connector being for inlet coolant from the conduit 90 and one being for outlet coolant delivered to the conduit 92. These and other structural details also appear in the cross sectional views shown in FIG. 4 (taken at 4—4 in FIG. 3), FIG. 5 (taken at 5—5) and FIG. 6 (taken at 6—6 in FIG. 5).

Each of the stationary trays 132 is a cylindrically shaped pate member which is attached to the inner wall of the hydrogenator vessel 72 by weldment or other attaching and supporting means (not shown), and which attaches normally thereto across the internal hollow of the hydrogenator vessel 72. Each stationary tray 132 has a centrally disposed clearance aperture through which the support shaft 104 extends, and through which rising processing oil travels to flow into the tray volume above each stationary tray 132.

Figure 4:
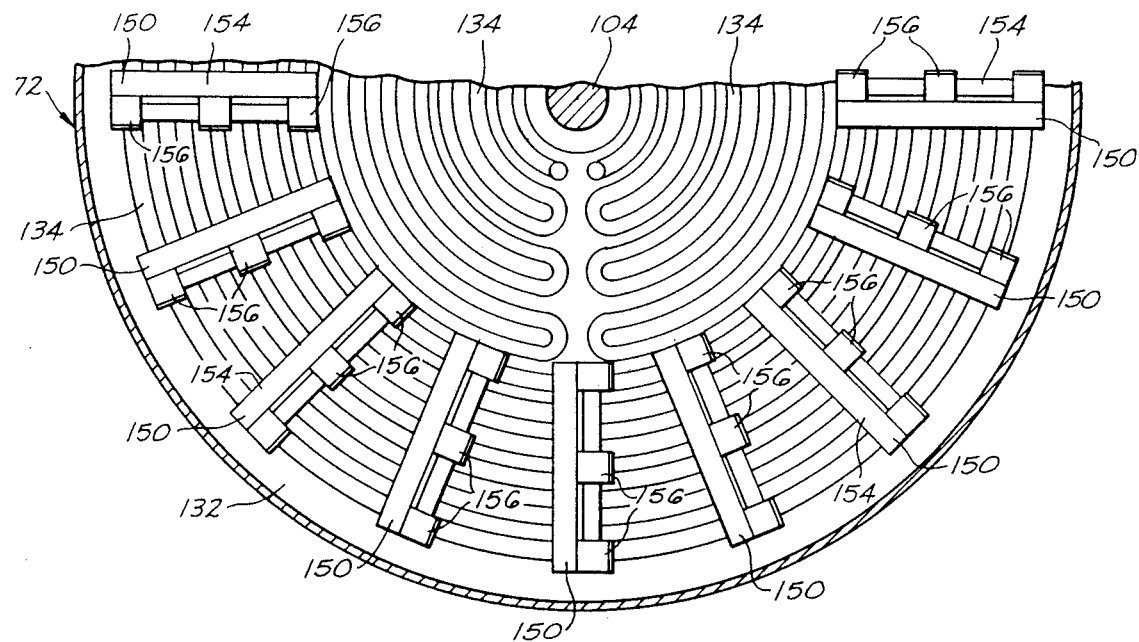
FIG. 4 is a partial plan view taken at 4—4 in FIG. 3 of one of the stationary liquid holding trays of the hydrogenator vessel.
Figure 5:
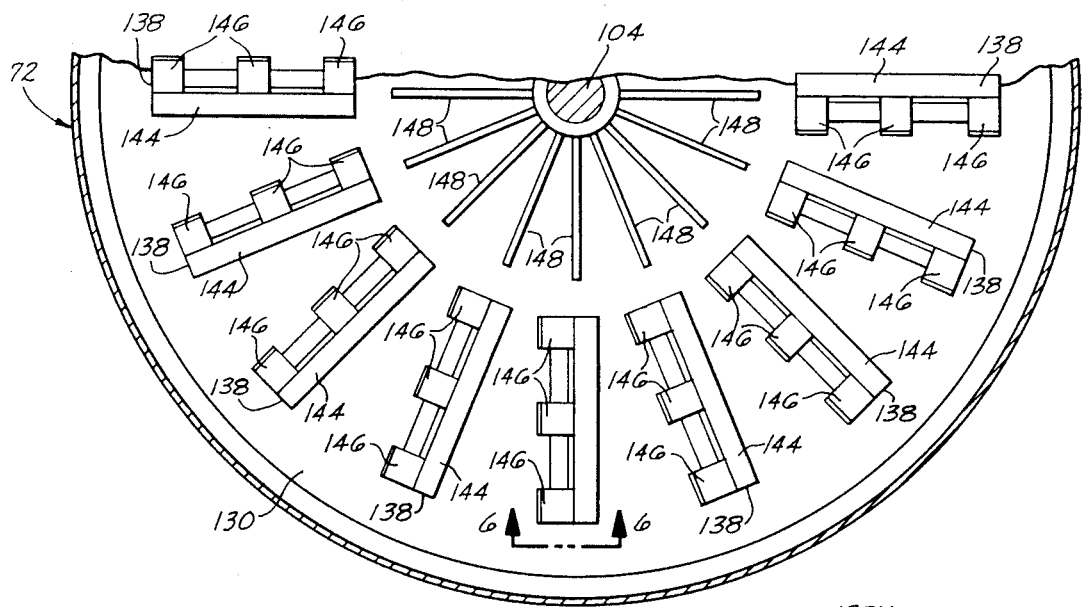
FIG. 5 is a similar partial plan view taken at 5—5 in FIG. 3 of one of the rotary liquid holding trays.

In like manner, each of the rotating trays 130 is a cylindrically shaped plate member having a centrally disposed bore through which the support shaft 104 extends, each such bore being sealed about the support shaft 104 as shown. That is, each rotating tray 130 is attached to the support shaft 104 via weldment or the like (not shown). Clearance is provided between the periphery of the rotating trays 130 and the innerwall of the hydrogenator vessel 72. The rising processing oil is caused to pass through these clearance spaces to flow into the tray volume above each rotating tray 130. Also appearing in FIGS. 3 through 5 are the following details:

138 and 140 depict upwardly and downwardly extensive-groups of three agitator blade members which are supported on opposing sides of each of the rotating trays 130. Each of the agitator members 138 and 140 is comprised of the following:

144 is a base member which is attached to the surface of the rotating tray 130; and 146 are plural spaced apart agitator blade members which are supported by the base member 144.

Figure 6:
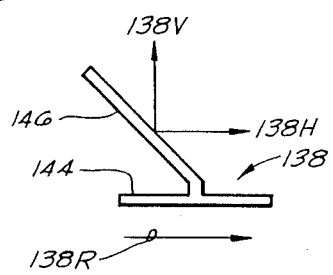
FIG. 6 is an end view of one of the agitator members supported by the rotary trays.

The detailed structure of the agitator members 138 and 140 will become clear as reference is made to FIG. 6, an end view of one of the agitator members 138. It will be noted that the blade members 146 are angularly disposed relative to the base member 144. The purpose of the angularity of the blades 146 is to cause such blades to impart a vertical velocity to the flowing processing oil and catalyst mixture to break up stratification that occurs as a phenomenon in all known prior art hydrogenators, as discussed hereinabove.

Returning to FIGS. 3 through 5:

148 depicts a plurality of separator plates that support the rotating trays 130 and which extend along the surfaces of the rotating trays 130 from the support shaft 104 to segment the upper and lower surfaces of each of the rotating trays 130; further, the separator plates 148 serve as stiffeners for the rotating trays 130.

150 and 152 depict upwardly and downwardly extensive stator members which are supported on opposing sides of each of the stationary trays 132. Each of the stator members 150, 152 comprises the following details:

154 is a base member which is attached to the surface of the stationary trays 132; and 156 depicts plural, spaced apart stator blade members which are supported by the base members 154.

The stator members 150, 152 are similar in construction to that described for the agitator members 138, 140 so further description will not be necessary The stator blades 156 are also angularly disposed to impact the flowing processing oil/catalyst mixture with a vertical velocity for the reason discussed above.

The agitator members 138, 140 and the stator members 150, 152 are spatially positioned so that the agitator blade members 146 and the stator blades members 156 will clearingly mesh as the rotating trays 130 are caused to rotate by the support shaft 104 relative to the stationary trays 132. FIG. 6 depicts an end view of one of the agitator members 138 supported by one of the rotating trays 130. As the tray 130 rotates in the direction 138R, the blade member 146 will impact the processing oil and catalyst (as will the blade member 156) so as to impart a vertical force component 138V and a horizontal force component 138H to the fluid, thereby effecting great turbulence to the fluid and preventing fluid and vapor stratification by reason of the vertical force component 138V.

158 in FIG. 3 depicts a plurality of weir members, or check dams, supported on the underside of the stationary trays 132. Each weir member 158 has a generally cylindrically shaped dam portion 158A and a base portion 158B which is secured to the underside of the supporting stationary tray 132 such as by welding. The dam portion 158A is dimensioned to clear the underlying rotating tray 130 by a predetermined fluid passing distance. This causes fluid backup onto the rotating tray 130 as the processing fluid and catalyst mixture is made to flow beneath the weir member 158.

160 depicts a plurality of similar weir members, or check dams, supported at the periphery of the rotating trays 130 in the manner shown. Each weir member 160 has a generally cylindrically shaped dam portion 160A and a base portion 160B which is secured to the supporting rotating tray 130 such as by welding. The dam portion 160A is dimensioned to clear the underlying stationary tray 132 by a predetermined fluid passing distance to backup the processing fluid and catalyst mixture onto the rotating tray 130. The cooperative effect of the operation of the weir members 158 and 160 is to cause the processing fluid, which is passing upwardly through the hydrogenator vessel 72, to flow in a circuitous path through the clearances between the stationary trays 132 and the support shaft 104, and between the rotating trays 130 and the inner wall of the hydrogenator vessel 72, to fill the tray volumes above each of the rotating and stationary trays 130, 132, and further, by selectively establishing the clearance beneath the weir members 158A and 160A, the velocity of the passing processing fluid can be slowed to provide a determined residence time of the fluid within the tray volumes.

162 depicts a plurality of hydrogen spargers which sparge the hydrogen received from the inlet hydrogen conduits into the oil flow and are disposed at intervals in the hydrogenator vessel 72 at the underside of selected ones of the stationary trays 132. Two types of hydrogen sparger nozzle assemblies are employed, as follows: 162A is a conventional sparging nozzle assembly having a plurality of diffusing apertures for dispersion of hydrogen gas into the flowing oil. As discussed above, this sparger will disperse the bulk of the hydrogen reacted, but finer control of hydrogen gas dispersion is required to achieve the uniformity desired. 162B is a sparging nozzle assembly that series this latter object, and is discussed further below. The hydrogen spargers 162 are disposed near the clearance of the interior opening of the supporting trays 132 near the support shaft 104 so that hydrogen gas, received from the hydrogen conduits 96A through 96C, is dispensed into the processing fluid at the maximum velocity points, $V_1$, along its flowing path. A pair of the hydrogen spargers are supported on the underside of the selected stationary trays 132, with one of same having the conventional sparing nozzle 162A and the other sparger having the unique sparging nozzle 162B. The distance between the stationary trays 132 which support pairs of the hydrogen spargers 162 defines a compartment volume, with each compartment volume being a controlled segment of the hydrogenator vessel 72 for process reaction purposes.

Figure 3A:
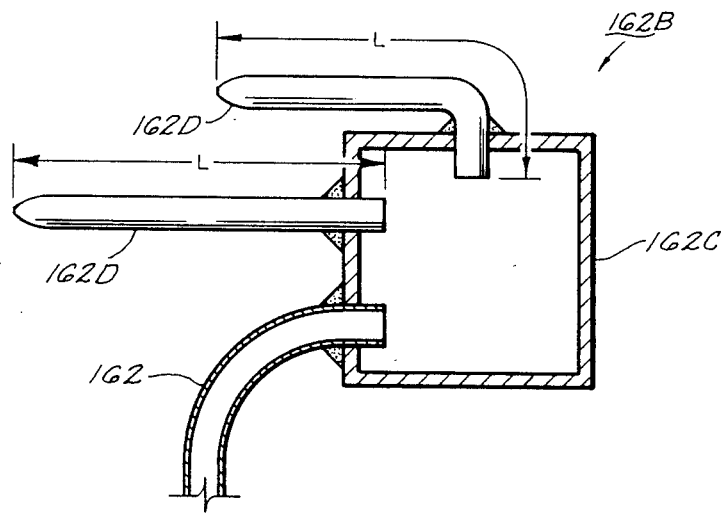
FIG. 3A is cross sectional view of a sparging nozzle assembly utilized in the hydrogenation vessel of FIG. 2.
Figure 3B:
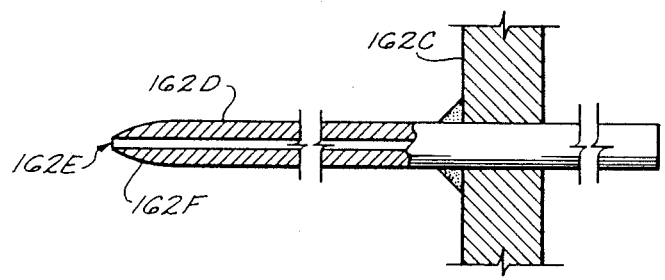
FIG. 3B is partial cutaway view of one of the tubes of the sparging nozzle assembly.
Figure 12:
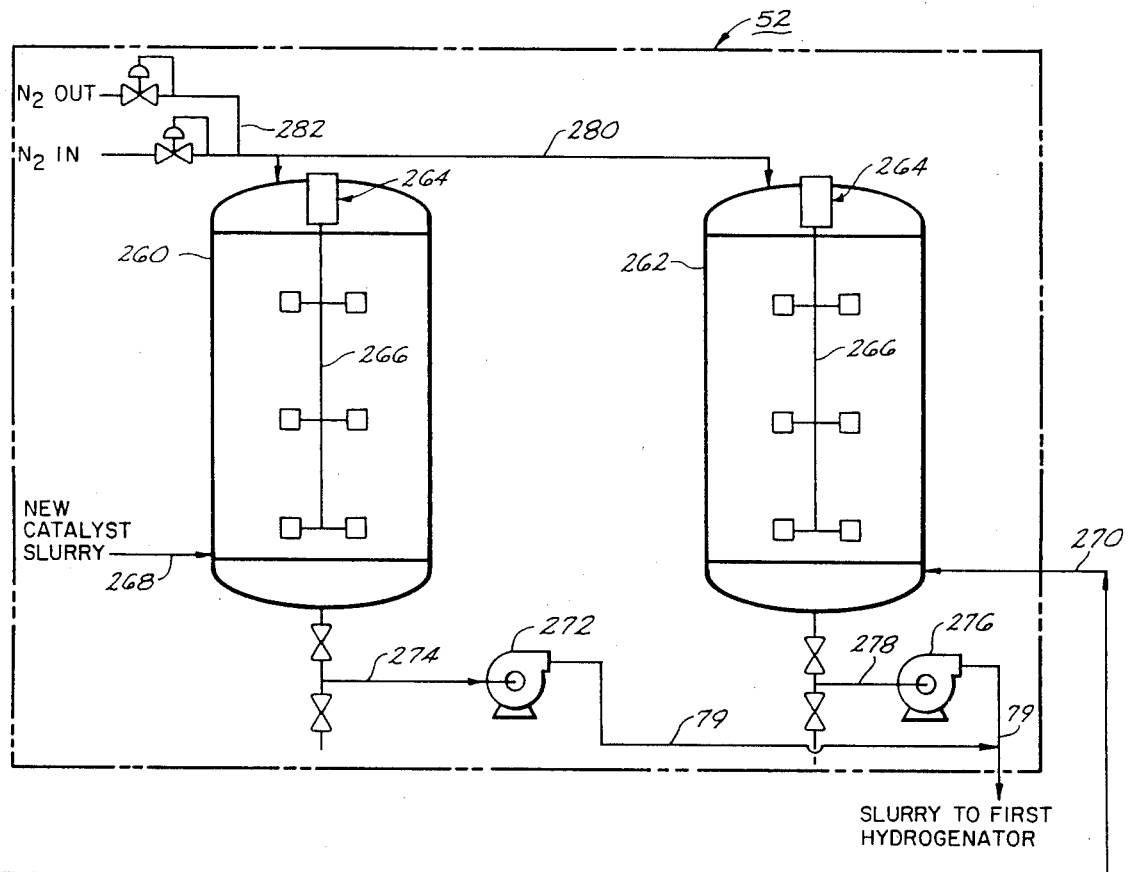
FIG. 12 is a schematical depiction of the catalyst storage and feeder station and the oil-catalyst separator station of FIG. 1.
Figure 12:
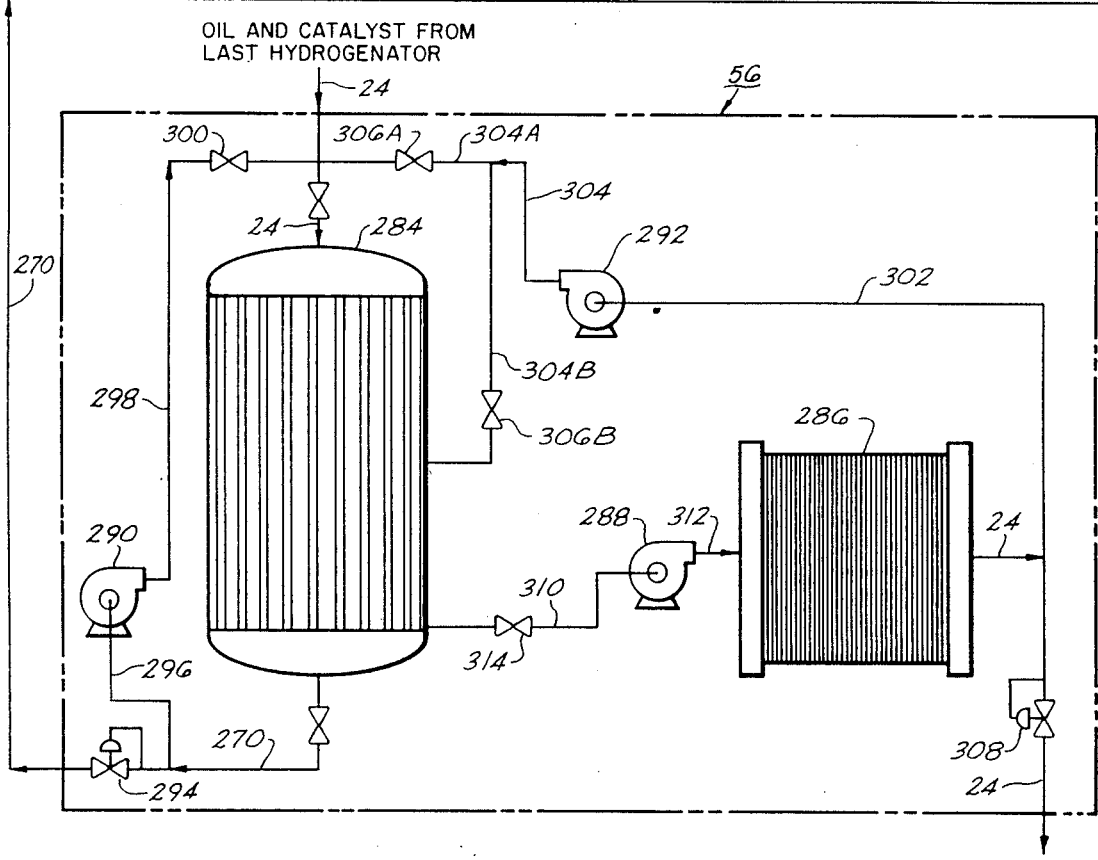

The sparging nozzle assemblies 162B utilized in the hydrogenator vessels 72 are constructed in accordance with the teaching of the U.S. Pat. No. 4,613,410, incorporated herein by reference, and more specifically, as illustrated in FIGS. 12 through 14 of that patent application. As depicted in FIG. 3A of the present disclosure, each sparging nozzle assembly 162B includes a hollow, ring shaped body portion 162C through which extends a pair of small tubes 162D, one of which is shown in more detail in FIG. 3B. Each of the small tubes 162D has a length L and has a capillary bore 162E extending the length L and communicating with the interior of the conduit bearing hydrogen gas for the dispersing of hydrogen therethrough. The size of the internal diameter of these capillary bores 162E will determine the size of hydrogen bubbles formed in the oil as hydrogen is dispersed in the oil from the tubes 162D. A typical capillary bore 162E will be of the order of 0.025 to 0.250 millimeters in order to effect the bubble characteristics described more fully in my aforementioned patent. To this end, the tips 162F of the tubes 162D are tapered and sharpened to a cone configuration.

The body portions 162C can be configured in a variety of shapes, such as the hollow ring configuration described above which is so established to effect hydrogen distribution uniformly in the oil flowing near and through the center openings of the stationary trays 132 as the oil flowing therethrough rises about the center support shaft 104 of the hydrogenator vessels 72. Also, the tubes 162D can be extended in various configurations as necessary to achieve uniformity of distribution of the dispersed hydrogen, and if desired, the tubes 162D can be vibrated by a vibrator (not shown) to decrease the size of the hydrogen bubbles. The warning device taught in U.S. Pat. No. 4,613,410 can also be utilized should need occur for detecting tube structural changes during hydrogenation.

Figure 7:
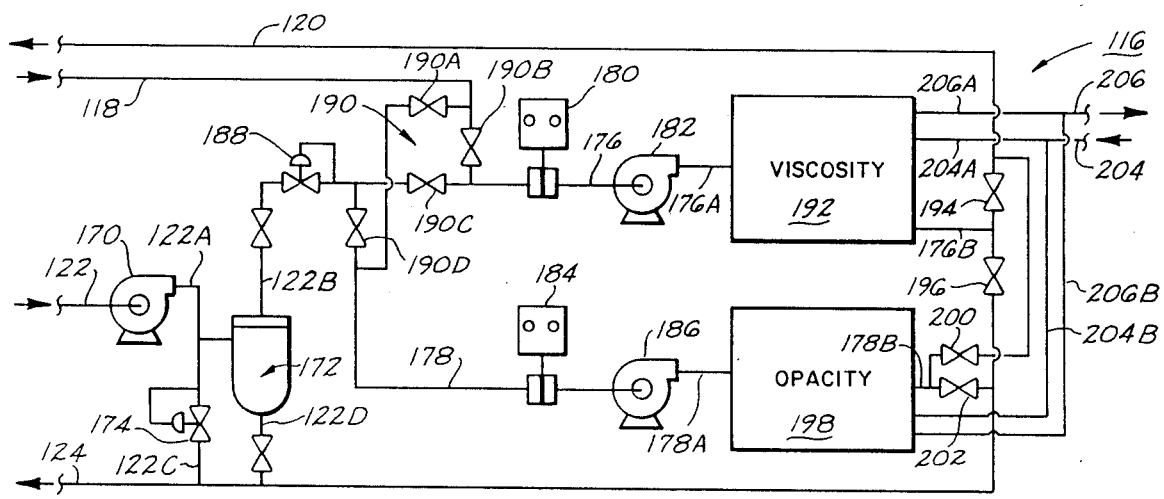
FIG. 7 is a schematical representation of the oil quality monitor of the hydrogenation station of FIG. 2.

The quality monitor station 116 will now be described with reference to FIG. 7 wherein is shown a schematic of the piping support thereof. In addition to the calibration sampling conduit 118 and sample return conduit 120, the quality monitor station also communicates with a source of the processing oil, that is, partially hydrogenated oil from the conduit 122. Also, a cooling medium is passed through the quality monitor station 116 in the manner described below. The quality monitor station 116, with specific reference to FIG. 7, comprises the following:

170 is a pump which is connected to the oil sampling conduit 122 to pass the high pressure oil sample to conduit 122A.

172 is a filter assembly through which the high pressure oil sample is passed from conduit 122A to 122B. The filter assembly 172 serves to remove the finely dispersed catalyst from the oil and will consist of several filters that are appropriately piped with bypass conduits and valving to enable a fresh filter to be constantly placed into service. A filter blow down line 122D is supplied, with appropriate valving, to connect to the sample return conduit 124 and serves for conventional back flushing of the filters.

174 is a back pressure control valve in conduit 122C, of conventional structure, to maintain a predetermined pressure in the conduit 122A to the filter assembly 172.

176 and 178 are conduits connected to conduit 122B.

180 and 182 are a conventional flow meter and an extremely low volume and high pressure pump, respectively, connected in the conduit 176; and 184 and 186 are a conventional flow meter and a pump, respectively, connected in the conduit 178.

188 is a pressure reducing valve in the conduit 122B which serves to maintain a predetermined pressure to the conduits 176 and 178.

190 is a valving arrangement comprising several valves in the conduits 118, 176 and 178. The calibration sampling conduit 118 communicates with both conduits 176 and 178, respectively, to selectively open and close fluid communication between the conduits 122B and conduits 176 and 178. Thus, the valving arrangement 190 permits a choice of flow to the conduit 176 or the conduit 178; that is, the calibration sampling conduit 118, with valves 190A and 190B open (and valves 190C and 190D closed), passes unhydrogenated oil to the conduits 176 and 178 for the purpose described below; and the conduit 122B, with valves 190C and 190D open (and valves 190A and 190B closed), passes filtered oil from the outlet oil conduit 78 of the hydrogenator vessel 72 via conduit 122 to the conduits 176 and 178.

192 is a viscosity monitor station which is fluid connected to the output side of pump 182 via conduit 176A. Fluid exits the viscosity monitor station 192 via conduit 176B which communicates with both the sample return conduit 120 and the sample return conduit 124.

194 and 196 depict valves disposed in the sample return conduit 120 and the sample return conduit 124, respectively, the purpose of which being to selectively open and close these conduits to fluid communication with the conduit 176B.

198 is an opacity monitor station which is fluid connected to the output side of pump 186 via conduit 178A. Fluid exits the opacity monitor station 198 via conduit 178B, which bifurcates to connect to both the sample return conduit 120 and the sample return conduit 124.

200 and 202 are valves disposed in the branches of the conduit 178B to selectively open and close the conduit 178B to the sample return conduit 120 and the sample return conduit 124, respectively.

204 is an inlet coolant conduit which passes a coolant, such as water, to both the viscosity monitor station 192 and the opacity monitor station 198 via conduits 204A and 204B, respectively.

206 is an outlet coolant conduit which is connected to both the viscosity monitor station 192 and the opacity monitor station 198 via conduits 206A and 206B, respectively, to remove the coolant provided by the inlet coolant conduit 204.

The quality monitor station 116 has a testing mode and a calibration mode. In its testing mode, a quantity of processing oil and catalyst is fed to the quality monitor station 116 via the oil sampling conduit 122 which passes same to the filter assembly 172. The filtered oil passes through conduit 122B and the pressure reducing valve 188, and a first portion of the oil passes through conduit 176, valve 190C, flow meter 180, pump 182 and conduit 176A to the viscosity monitor station 192, while a second portion of the filtered oil passes from conduit 122B through conduit 178, valve 190D, flow meter 184, pump 186 and conduit 178A to the opacity monitor station 198. In the testing mode, the valves 190A, 190B in the calibration sampling conduit 118, and the valves 194, 200 in the conduit 176B and 178B, respectively, are all closed. In the calibration mode, a quantity of unhydrogenated oil from the flow ahead of the initial hydrogenator vessel 72 is fed to the quality monitor station 116 via the calibration sampling conduit 118; a first portion of the unhydrogenated oil passes through valve 190B, conduit 176, flow meter 180, pump 182 and conduit 176A to the viscosity monitor station 192; and a second portion of the unhydrogenated oil passes through valve 190A, conduit 178, flow meter 184, pump 186 and conduit 178A to the opacity monitor station 198. In the calibration mode, the valves 190C and 190D in the conduits 176 and 178, respectively, are closed, as are the valves 196 and 202 in the conduits 176B and 178B.

Figures 8A, 8B:
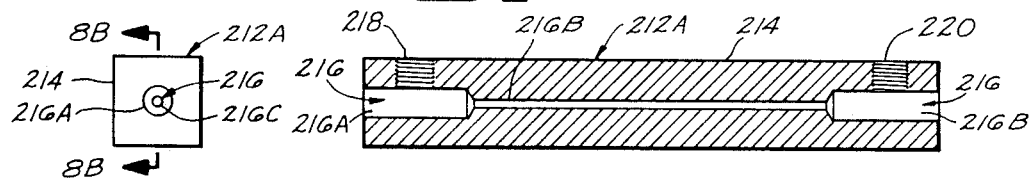
FIGS. 8A and 8B, respectively, are end and side cross sectional views of one of the interstice devices of the viscosity monitor station.
Figure 8:
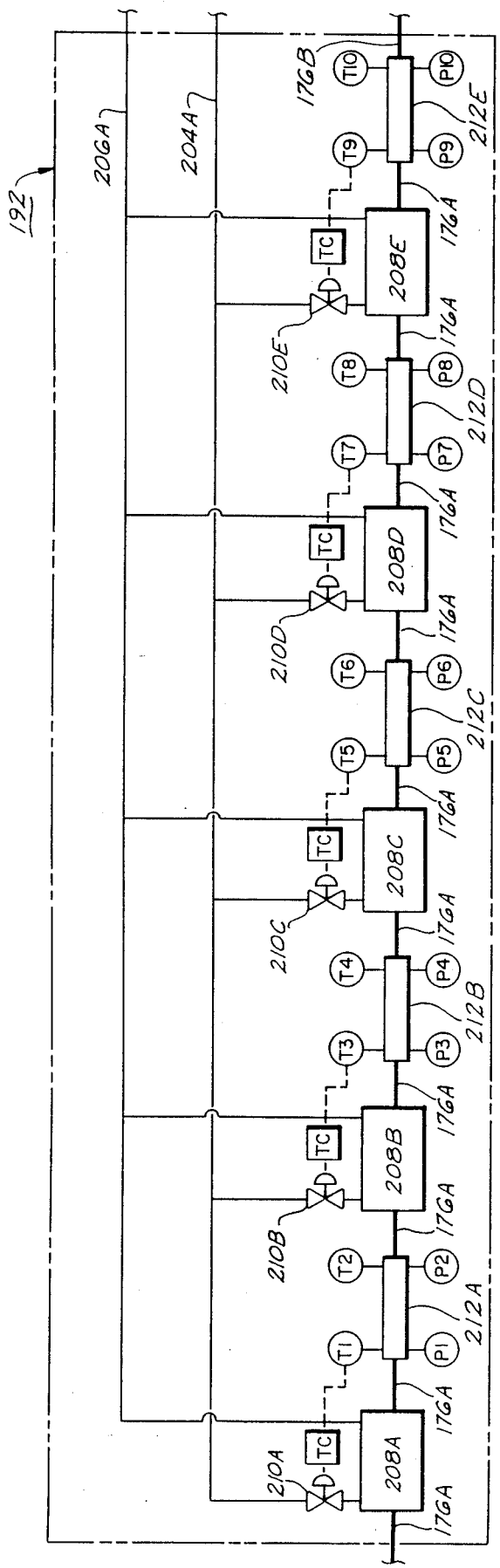
FIG. 8 is a schematical representation of the viscosity monitor station portion of the oil quality monitor of FIG. 7.

In FIG. 8, a schematic of the viscosity monitor station 192 is provided, which reveals that such is comprised of the following components.

208 depicts a plurality of in line heat exchangers or coolers, in fluid communication with the conduit 176A. (The designation of 176A is used in FIG. 8 to denote each of the interconnecting conduits throughout the viscosity monitor station 192.) For clarity, these heat exchangers are designated as 208A through 208E. Each of these heat exchangers 208 is preferably a shell and coil type cooler, with the internal coil being in fluid communication with the inlet coolant conduit 204A and the outlet coolant conduit 206A.

210 designates a plurality of temperature controlled diaphragm valves disposed in the inlet coolant conduit 204A at the inlet of each of the heat exchangers 208 as shown. For clarity, these diaphragm valves are desiqnated as 210A through 210E.

212 depicts a plurality of interstice devices disposed in fluid communication with the fluid exiting each of the heat exchangers 208A through 208E. For clarity, these interstice devices are designated 212A through 212E in FIG. 8, with more detailed views of one of the interstice devices being shown in FIGS. 8A and 8B.

Each of the interstice devices 212 comprises an elongated block member having a bore extending therethrough and having inlet ports which serve for fluid flow and for physical parameter instruments. More specifically, the interstice device 212A shown in FIGS. 8A and 8B comprises the following.

214 depicts the block member which serves as the body portion of the interstice device 212A.

216 depicts the longitudinal bore which extends through the block member 214, with the inlet portion 216A and the outlet portion 216B being of enlarged diameter to receive the sensing ends of thermocouples (not shown). The bore portions 216A and 216B can be internally threaded, if desired, or the thermocouple ends can be pressure soldered in place. A portion of the longitudinal bore 216 is a calibrated interstice 216C which typically will be about 0.050 inch in internal diameter, but whatever the selected diameter size is, the interstice 216C is a high tolerance bore extending for a precision length.

218 and 220 are an inlet port and an outlet port, respectively, in the block member 214 and communicate at opposing ends thereof with the longitudinal bore 216. The inlet and outlet ports 218, 220 are threaded so as to be connectable in the conduit 176A for passage of filtered fluid through the interstice 216C.

Returning to FIG. 8, the symbols P1 and P2 represent pressure measurements by sensing devices such as pressure transducers attached to the interstice device 212A, and T1 and T2 represent the temperature measurements made by the abovementioned thermocouples attached thereto. As indicated, the control line of the temperature controlled diaphragm valves 210A is connected to the thermocouple measuring T1 so that the amount of coolant admitted to the heat exchanger 208A is controlled to achieve a predetermined temperature of oil passing to the interstice device 212A. It is known that an interstice, such as the interstice 212A, will permit a certain flow rate of fluid through it regardless of inlet pressure fluctuations within a wide pressure range. Thus, the interstice device 212A, disposed as described, will permit a known quantity of flowing oil therethrough at a measured temperature.

Each of the other interstice devices shown in FIG. 8 is identical in construction to that described for the interstice device 212A, and the only difference in the interstice devices 212B through 212E will be the pressure and temperature of the flowing oil sample, as follows. The diaphragm valve 210B is controlled by the thermocouple measuring T3 of interstice device 212B, the outlet temperature of the heat exchanger 208B will be T4, and the pressure at opposing ends of the interstice 212B will be P3 and P4. The diaphragm valve 210C is controlled by the thermo-couple measuring T5 of interstice device 212C, the outlet temperature of the heat exchanger 208C will be T6, and the pressure at opposing ends of the interstice 212C will be P5 and P6. The diaphragm valve 210D is controlled by the thermocouple measuring T7 of interstice device 212D, the outlet temperature of heat exchanger 208D will be T8, and the pressure at opposing ends of the interstice 212D will be P7 and P8. The diaphragm valve 210E is controlled by the thermocouple measuring T9 of interstice device 212E, the outlet temperature of the heat exchanger 208E will be T10 and the pressure at opposing ends of the interstice 212E will be P9 and P10.

The viscosity monitor station 192 provides a collection of data of temperature, pressure and flow rate for a plurality of interstice devices, and as will be discussed more fully hereinbelow, this data will be dealt with to derive a family of curves illustrated by the graph shown in FIG. 9 in which average temperature (across each interstice) is the abscissa , and the pressure drop divided by the flow rate (w) across each interstice is the ordinate. More about the construction and purpose of the curves of FIG. 9 will be provided hereinbelow. Also, it should be noted that the purpose of the serially disposed interstice devices 212 is to obtain viscosity data of the kind described, and while the interstice devices 212 represent the preferred embodiment for achieving same, it is recognized that other types of viscometers can also be utilized in the practice of the present invention. For example, one may choose to use the Model TT100 inline viscometers made by Brookfield Engineering Laboratories, Inc. and sold by Viscosel Corporation of Stoghton, Mass..

Figures 10A, 10B:
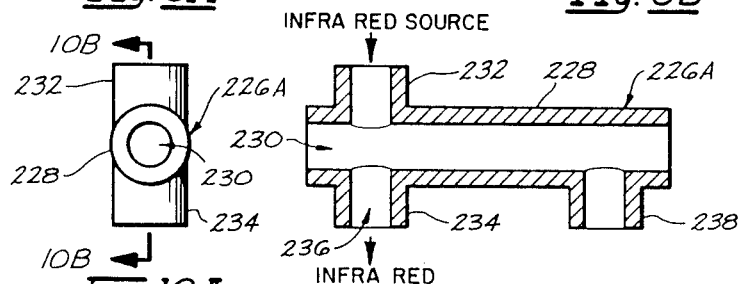
FIGS. 10A and 10B, respectively, are end and side cross sectional views of one of the opacity measurement members of the opacity monitor station.
Figure 10:
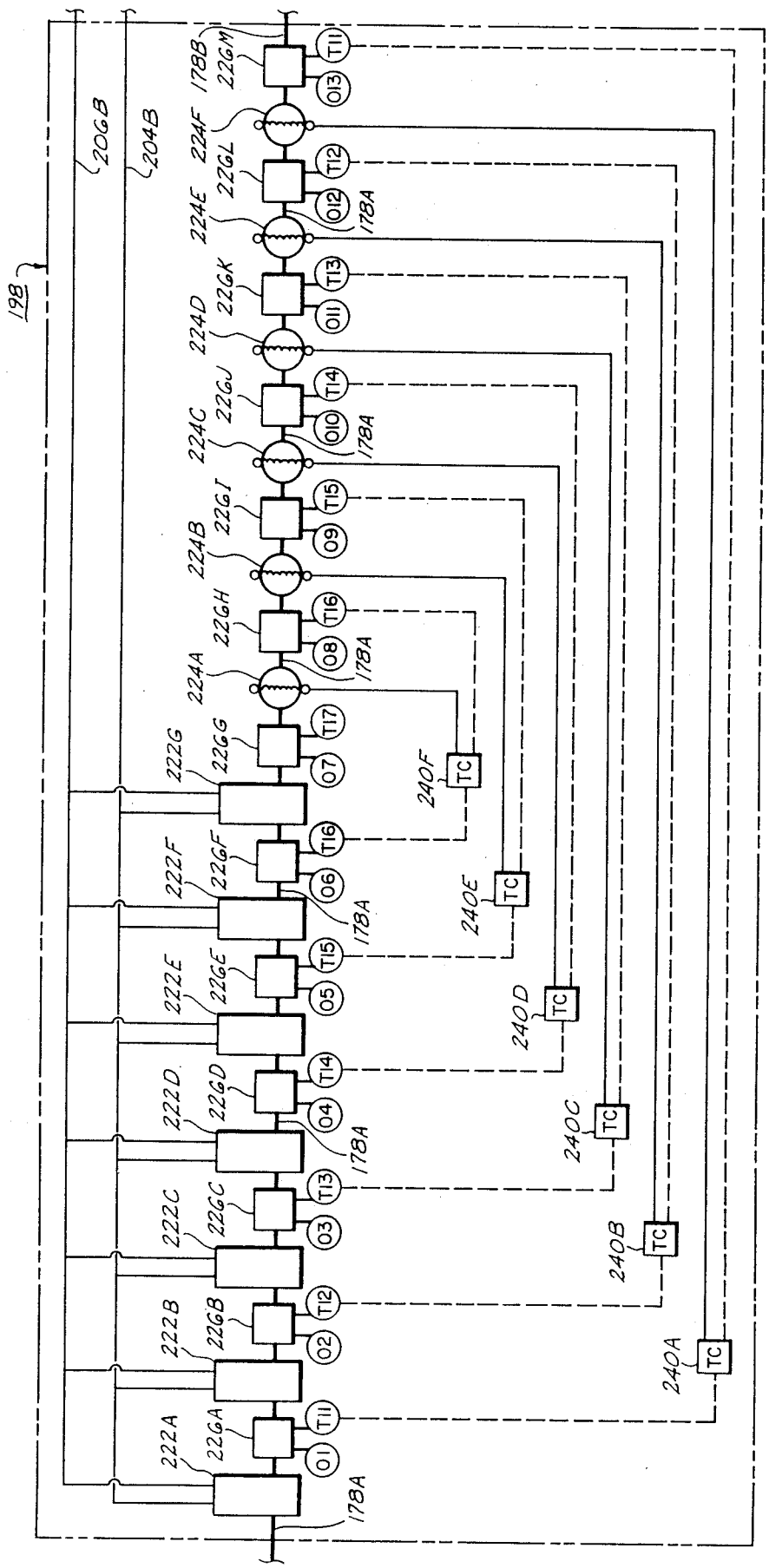
FIG. 10 is a schematical representation of the opacity monitor station portion of the oil quality monitor of FIG. 7.

Turning now to FIG. 10, shown therein is a schematic of the opacity monitor station 198 which reveals that such comprises the following.

222 depicts a plurality of in line heat exchangers in fluid communication with the conduit 178A. (For convenience, each of the interconnecting conduits throughout the opacity monitor station 198 will be labeled as 178A as well.) These heat exchangers are designated as 222A through 222G. Each of the heat exchangers 222 is preferably a shell and coil type cooler with an internal coil being in fluid communication with the inlet coolant conduit 204B and with the outlet coolant conduit 206B.

224 depicts a plurality of in line electrical heaters in communication with the fluid in conduits 178A. These heaters, for convenience, are designated 224A through 224F, and each preferably has a fluid chamber with a submersible electrical heating coil connected to an appropriate power source for heating the fluid passing therethrough. Such heaters are conventionally known, so further details of structure and control circuitry need not be provided herein.

226 designates a plurality of opacity measurement members interdisposed between the heat exchangers 222 and the electrical heaters 224 as shown, the opacity measurement members being in fluid communication with the conduits 178A. For convenience of designation, these opacity measurement devices are labeled 226A through 226M. As depicted in FIG. 10, these components are disposed such that the oil sampled passes serially through the opacity measurement members 226A–226M after being selectively cooled/heated by the heat exchangers 222A–222G and the electrical heaters 224A–224F, which are disposed to progressively cool and then heat the flowing oil as the oil moves down this line of opacity measurement members 226.

Each of the opacity measurement members 226 is constructed as shown in FIGS. 10A and 10B wherein is shown the opacity measurement member 226A, in partial detail, as follows.

228 is the tubular body portion of the opacity measurement member 226A.

230 is a longitudinal bore extending the length of the body portion 228.

232 and 234 are tubular extensions on opposing sides of the tubular body portion 228.

236 is the bore extending through the tubular extensions 232 and 234, the bore 236 communicating with the longitudinal bore 230.

238 is a thermocouple well member supported at the distal end of the body portion 228.

Not shown in FIGS. 10A and 10B is the thermocouple which is inserted in the well member 238 to extend into the longitudinal bore 230. Also, an infrared source of conventional design is supported on the tubular extension 232, and an infrared measurement target is supported on the tubular extension 234, neither of which is shown. In operation, the opacity measurement member 226A is connected in the conduit 178A to pass fluid therefrom through the longitudinal bore 230. Infrared radiation is emitted to pass through the flowing liquid in the longitudinal bore 230, and the attenuation of the infra red radiation is measured by the infrared target on the tubular extension 234. While infrared radiation is discussed herein and is in fact the preferred radiation range, it is believed that other ranges of radiation energy may be appropriate, depending on the characteristics of the flowing fluid and the opacity changes encountered in the reaction chemistry at hand.

The purpose of the first half of the opacity monitor station 198 (through the opacity measurement member 226G) is to measure the attenuation of infrared radiation in the flowing fluid as it is progressively cooled by the heat exchangers 222A through 222G, this attenuation being a measure of the increase in opacity in the fluid as the partially hydrogenated oil passes through crystalline formation. In FIG. 10, the opacity measurement portions (that is, the infra red sources and targets) are designated as 01 through 013 for the opacity measurement members 226A through 226M; the respective temperature measurements for the opacity measurement members 226A–226G are designated T11 through T17; and in declining order, the respective temperature measurements for the opacity measurement members 226H–226M are designated T16 through T11.

240 designates a plurality of temperature controllers which are disposed to sense selected temperatures, make comparisons of the sensed temperatures, and control the electrical heaters 224 in response thereto. For convenience, these temperature controllers are labeled 240A through 240F. As will be noted in FIG. 10 temperature controller 240A senses temperature T11 of opacity measurement member 226A and temperature T11 of opacity measurement member 226M. This points out that each of the temperature controllers 240 senses the temperature of the paired opacity measurement members 226 which have the same thermocouple labelling in FIG. 10, namely, the following paired opacity measurement members: 226A/226M; 226B/226L; 226C/226K; 226D/226J; 226E/226I; and 226F/226H. In each case for these paired opacity measurement members, the temperature controller 240 senses the temperature at the first one of the opacity measurement members and it controls the temperature at the second of opacity measurement members that make up the pair—such as T11 of both opacity measurement members 226A and 226M by temperature controller 240A—which then controls the electrical heater 224F (upstream to the second of the opacity measurement members, which is 226M) to cause T11 of the opacity measurement member 226M to match T11 of the upstream opacity measurement member 226A. Thus, the temperature controllers 240A–240F sense the temperatures at the opacity measurement members 226A–226F and control the electrical heaters 224A–224F to cause temperatures at the opacity measurement members 226H–226M (via control of the heaters 224A–224F) to match. In other words, a cooling profile is effected by the heat exchangers 222A–222G, and opacity measurements of the flowing fluid are made at specific temperature points therealong; then this cooling profile is reversed—a mirror image heating profile is effected by the electrical heaters 224A–224F—and the opacity readings are made on the flowing fluid at nearly exact temperatures along a rising heating profile as was done on the dropping cooling profile. Curves of the opacity measurements versus temperature readings for both decreasing temperatures are shown in FIG. 9A, and labeled as follows.

242 designates the curve generated by opacity measurements 01 through 07 as the fluid is caused to be cooled from T1 through T17;

244 designates the curve generated by opacity measurements 08 through 013 as the fluid is caused to be heated from T16 through T11; and 246 designates a straight line drawn through the average of the central values of curves 242 and 244, curve 246 being a selected working curve for purposes discussed more fully below.

In operation, there are a number of process variables which will influence the hydrogenation reaction which occurs in the hydrogenator vessel 72 shown in FIG. 2 and in each succeeding hydrogenator vessel. Of course, process experience will be obtained for a particular oil to be processed as is the case always in pilot and early start-up operations. The process variables for the hydrogenator vessel 72 include: fluid agitation (determined by the rotation speed of the support shaft 104 via the motor 110); the amount of hydrogen sparged into the fluid via the spargers 162; the rate of oil flow to the hydrogenator vessel 72 and the fluid velocities generated therein; the temperature of the system; the pressure held on the system: and the strength of the catalyst. With experience, a plant operator will know the effect that these parameters, individually and in selected combinations thereof, will have on the hydrogenation reaction of the oil.

As will be clear from the above discussion, two distinct quality analogies are made. The first analogy is the equivalent of the Iodine Value which is represented at the right side of the viscosity curves. The viscosity monitors create a family of curves, one for each hydrogenator, all of which have been calibrated with the same unhydrogenated oil feeding the first hydrogenator, such that the process is controlled in the progression of the oil through the hydrogenators. This provides nearly instantaneous quality data for the plant operator. The second quality analogy is the opacity monitor by the use of which in a serial fashion also creates a family of curves, one for each hydrogenator and all of which have been calibrated with the same unhydrogenated oil feeding the first hydrogenator, such that the process is controllable with regard to the plastic characteristics progression as measured by the Solid Fat Index.

More specifically, oil quality data reference curves for various unsaturation levels of the particular oil being hydrogenated will be generated as follows. Assuming that the inlet oil stream 26 is an oil of the type discussed hereinabove, a portion of the unhydrogenated oil coming from the head of the hydrogenation process, upon which have been determined the Iodine value and the Solid Fat Index, is passed through the calibration sampling conduit 118, including the coil 118A, to the conduit 176 (FIG. 7). Thus, the oil portion will pass through the viscosity monitor station 192 (in its calibration mode) via conduit 118, valve 190B, conduit 176, pump 182 and conduits 176A and 176B, valve 194 and sample return conduit 120. As the oil portion is passed sequentially through each of the heat exchangers 208A through 208E, the coolant in the conduits 204A and 206A cools the oil in stages, and values of the temperatures T1 through T10, the pressures P1 through P10 and the flow rate w (from the flow meter 180) are recorded. These parameter values, collected for samples of oil with varying degrees of unsaturation, are translated into reference curves like those depicted in FIG. 9, which depicts curves of varying unsaturation levels corresponding to Iodine Values of 72, 81, 90, 108 117, 126 and 135. Each partially hydrogenated oil curve is put into register by the respective monitor station of the hydrogenators via its respective viscosity monitor station 192. Thus, as the Iodine Value decreases (as hydrogenation occurs), the operating curve for the oil rises on the graph scale of FIG. 9.

In like manner to the above, data reference curves for the opacity monitor stations 198 (FIG. 10) are also collected for various plasticity levels of the particular oil being hydrogenated. The inlet oil (that is, the sample oil) is caused to also flow through valve 160A (valve 160D being closed), conduit 178, flow meter 184, pump 186, conduit 178A, opacity monitor station 198, conduit 178B, valve 200 (valve 202 is closed). and sample return line 120. As the oil sample is passe sequentially through each of the opacity measurement members 226A through 226G, the sample is cooled via the heat exchangers 222A through 222G. Following passage through the opacity measurement member 226G, the oil sample is sequentially heated via the electrical heaters 224A through 224F so that the entry temperature at each of the opacity measurement members 226H through 226M will correspond to the sample temperature exiting one of the opacity measurement members 226A through 226F. That is, temperature controller 240F measures T16 at opacity measurement member 226F and controls the electrical heater 224A to sufficiently heat the sample oil that the temperature of the sample in the opacity measurement member 226H is T16. As indicated, the temperature decay curve of the sample oil through the opacity measurement members 226A through 226G (the temperature decreases from T11 to T17) is matched by the temperature increase curve of the oil sample through the opacity measurement members 226H through 226M (the temperature increases from T17 to T11). While this is occurring, these temperature values are collected versus the value of opacity readings 01 through 013. For each sample of oil with a calibrated Solid Fat Index equivalent value predetermined prior to usage, a set of reference curves is obtained similar to the curves 242 and 244 of FIG. 9A. A working curve 246 (the numerical average of the mid range of the two curves) is calculated, and thus a family of family of working curves 246 is obtained for the calibrated samples.

When the data described above for the viscosity monitor station 192 and the opacity monitor station 198 are obtained by conventional transducers and thermocouples for sensing temperature and pressure, as well as flow rates and opacity readings, the data can be inputted to a conventional computer having CRT readout, and appropriate software has been designed to provide immediate viewing of same by an operating personnel. Further, the curves generated by the computer, that is, those like the ones depicted in FIGS. 9 and 9A, can be placed in memory for a variety of oils of known standardization for unsaturation and plasticity (or the calibration can be caused to take place manually or automatically on a determined schedule) to provide the viscosity and opacity reference curves. Then, as the hydrogenation process is taking place in the hydrogenation vessel 72, as well as in subsequent like vessels, a family of operating curves similar to those of FIGS. 9 and 9A is generated by the oil quality monitor station 116 on processing oil flowing to and returning from the oil quality monitor 116 via conduits 122, 124 which communicate with the effluent oil and catalyst mixture in conduit 78. This operating curve is generated very rapidly, and the operator personnel can continually view an updated operating curve on the computer CRT for each vessel and compare same to the family of reference curves, which will nearly instantly inform the operator of the quality progression of the effluent oil from the hydrogenator vessels. For example, if the operating curve of FIG. 9 is considered, the operator will be enabled to compare it to its nearest matching one of the family of reference curves, and thereby have an estimate of the unsaturation level of the effluent oil. In like manner, a comparison of the working curve 246 of FIG. 9A to the nearest matching one of the family of reference curves will give the operator an estimate of the plasticity progression of the effluent oil. Once the process parameters are established and constancy of conditions prevail, the operator is equipped via the comparison curves on the computer CRT to make changes in the reaction parameters (such as, hydrogen flow rate, temperature and pressure levels, oil flow rates, catalyst strength, etc.) to maintain the effluent quality within a predetermined range of acceptability, and this is achieved for every hydrogenator vessel that forms the hydrogenation station 54 of FIG. 2. This has not been accomplished in the edible oils industry prior to the present invention.

A discussion of the curves 242 and 244 is now in order, as an understanding of these curves will be most useful in understanding the present invention. While the working curve 246 of FIG. 9A (which is obtained from curves 242, 244) has been discussed as the reference curve selected for comparison purposes, it is known that the freezing and melting of oil crystals are time dependent, and that the shapes of the curves 242 and 244 may not be as symmetrical as shown in FIG. 9A for those circumstances where the flow rate through the opacity measurement members 226 does not permit sufficient time for the melting and freezing of the crystals to occur. In that case, it may be preferable to utilize only the curve 242 or the curve 244, in which case only half of the opacity measurement members 226 will be required to generate the reference curve; in which case, it is believed that the curve 244 (temperature increasing) will usually be the more consistent of the these curves to use as working curves.

Figure 9:
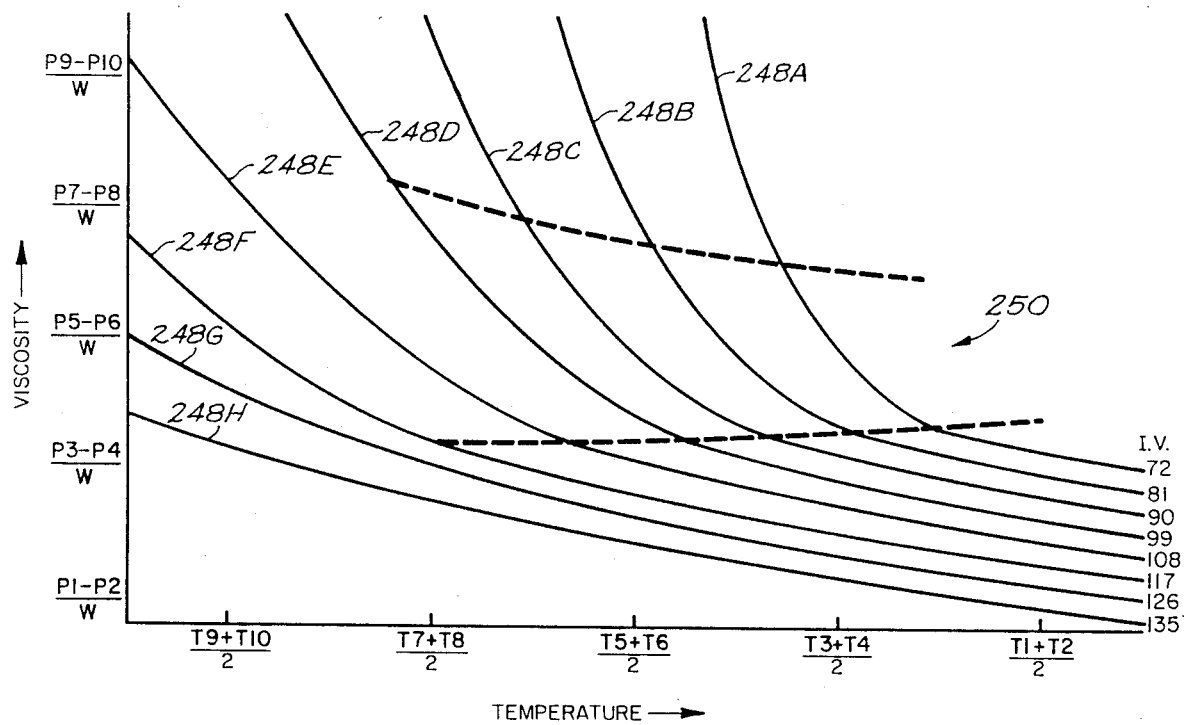
FIG. 9 is a graphical representation of viscosity and temperature data typically obtained for oil passed through the viscosity monitor station of FIG. 8, each of the curves shown therein being of an oil with the designated saturation value as measured by its Iodine Value titration.
Figure 9A:
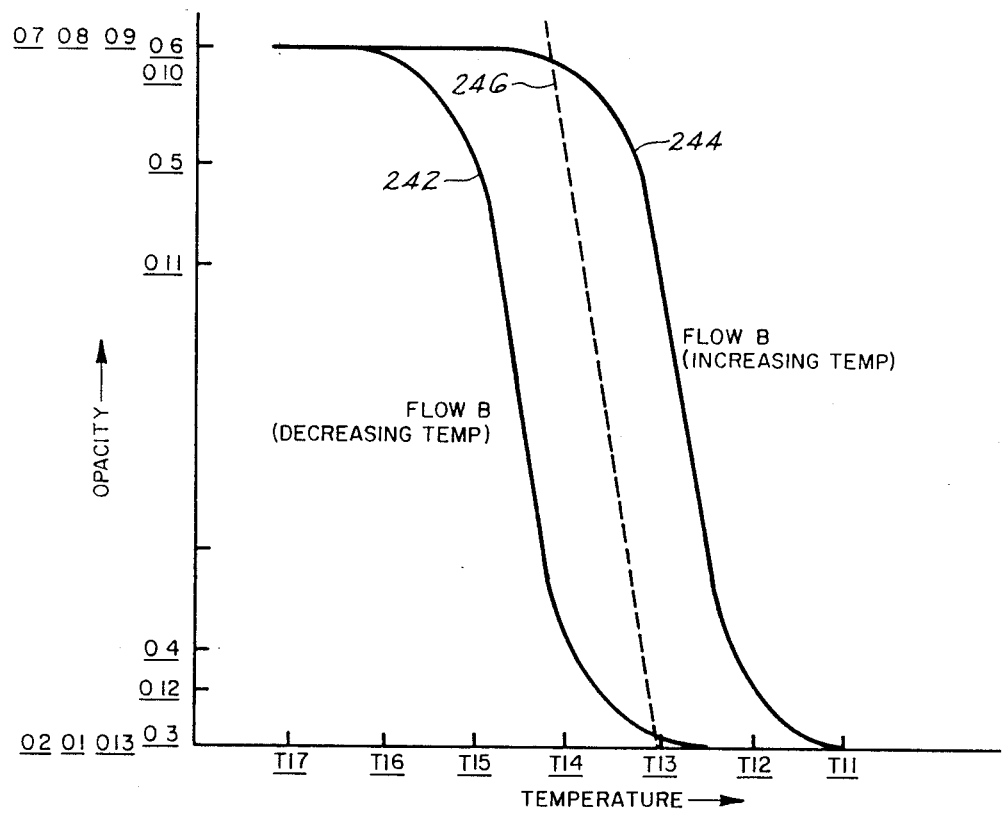
FIG. 9A shows a graphical representation of opacity and temperature data typically obtained for oil passed through the opacity monitor station of FIG. 7.

Depicted in FIG. 9 is a collection of several curves 248A through 248H representing various unsaturation levels as indicated. Curve 248A, for example, represents an oil sample which was determined to have an Iodine Value of 72, as noted in FIG. 9. In like manner, the curves 248B through 248H represent oil samples which were determined to have Iodine values of 81, 90, 99, 108, 117, 126 and 135, respectively. It will be noted that the curves 248A-248H are interestingly very similar and incrementally spatially removed from each other. Each of these curves has a rapidly descending left hand portion and a tapered linear portion to the right. A zone of crystallization 250 (between the dashed lines) can be established for a family of viscosity curves by connecting selected points on all of the curves which are determined from the completely frozen and completely melted temperature conditions of their respective opacity curves. To the left of the crystallization zone 250 is a plasticity predicting zone which is the indicator of the Solid Fat Index, while to the right of the crystallization zone 250 is a non-crystalline zone which is the indicator of the degree of unsaturation, that is, the Iodine Value of the oil. The portions of the several curves 248A-248H in the non-crystalline zone (to the right of crystallization zone 250) are substantially parallel, and it has been discovered that this zone of parallel linearity, especially if enlarged via an appropriate computer CRT display, is an extremely accurate set of viscosity reference curves useful for the prediction of unsaturation levels in the operation of the hydrogenator vessels 72. Further, the plasticity predicting zone (to the left of the crystallization zone 250) serves to augment curves 242, 244 or 246 (shown in FIG. 9A) in predicting the plastic characteristics of the oil as measured by the Solid Fat Index. In contrast to the non-crystalline zone (to the right of the crystallization zone 250) which is independent of the type of oil utilized, as this zone measures the degree of unsaturation of any edible oil, the plasticity predicting zone (to the left of the crystallization zone 250) is sensitive to the type of oil utilized in the system since plasticity is a function of trans-isomeric arrangements. Thus this zone's reliability as prediction reference curves will need be investigated for each particular oil of interest.

EXAMPLE

The following is a description of data obtained from equipment constructed to demonstrate the measuring and control methods of the present invention. More specifically, approximately 8 pounds of an oil sample being tested were contained in a storage tank equipped with an agitator to keep this volume at uniform temperatures. The tank was elevated to provide net suction head to a high pressure pump. The pump was a constant flow, positive displacement pump flowing at 0.064 pounds per second and capable of discharging at 1600 PSIG. Downstream from the pump was a copper heat exchanger containing the oil sample in the copper coils and using water on the shell side. Downstream from the heat exchanger was a viscosity measurement device which was an aluminum bar into which an interstice was shrink fitted. The interstice measured 0.030 inch for its inside radius and 6.679 inches in length. The aluminum bar measured 14 inches in length and had a square cross-section of 1.75 inches. It was equipped with a thermocouple fitting at each end to measure the input temperature and the output temperature, as the friction of the oil sample passing through the interstice created heat. The average temperature was taken for the results of the device. Cavities at each end of the aluminum bar were fitted with pressure transducers so that a computer could compute the differential pressure between the incoming oil and the effluent oil.

Downstream from the interstice was an opacity device which consisted of an infrared emitter and infrared receiver. These were placed across the flow of oil in a machining which also contained another thermocouple. The piping arrangement allowed for the oil flow to by-pass the interstice for opacity only measurements. From the opacity device the oil was returned to the storage tank.

All piping was plastic except for the high pressure loop between the pump and the interstice. The water flow to the heat exchanger was equipped with a side flow through an ice bath and also contained electrical heating elements so the rates of the heat added or removed were carefully controlled.

All data from the pressure transducers, the thermocouples and opacity device went through an analog to digital converter to make them compatible with an IBM XT computer. Appropriate software was used to develop the related curves displayed in FIG. 11, which is a photographic reproduction of a computer screen printout showing the display of the computed viscosity-temperature data for the oil samples described above.

As the determination of the degree of unsaturation for a given oil is a function of its relative viscosity when it has absolutely no crystals, three samples of known unsaturation were subjected to the prior art method for this measurement. In particular, they are as follows:

| A. | Unhydrogenated Soybean Oil | I.V. 135.0 |
|---|---|---|
| B. | Partially Hydrogenated Soybean Oil | I.V. 84.1 |
| C. | Partially Hydrogenated Soybean Oil | I.V. 74.8 |

Figure 11:
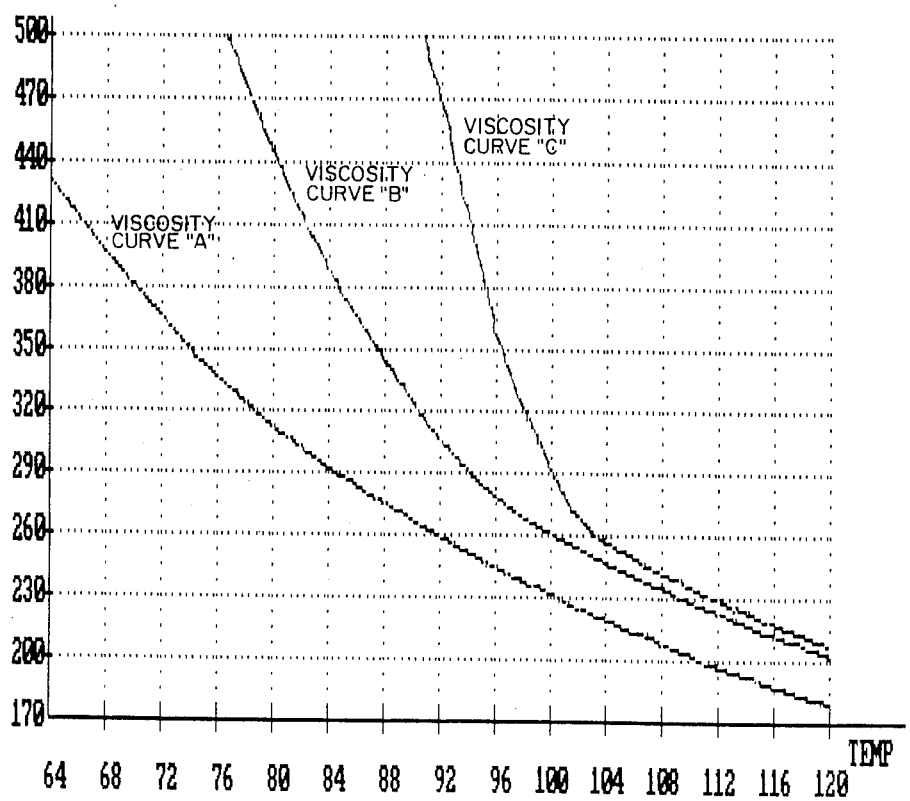
FIG. 11 is a photographic display of actual viscosity and temperature data obtained in the example described hereinbelow. Similarly.

The data for these oils when circulated through the above described equipment appear as Curves A through C, respectively, in FIG. 11. The portions of the respective curves above 104° F. approached a near linear projection as the three portions were parallel and separated in ratio to their respective values. Hence, the method can be calibrated to measure the Iodine Value for any oil or mixture of oils.

Noting Curve B of FIG. 11, the left end of the curve tends to become linear and has a constant slope. This characteristic is a measure of the plastic property of the oil. Likewise, Curve C similarly becomes linear at its left end and also projects a constant slope. The following data were obtained to provide the Solid Fat Indices for these two oils (samples B and C). The unhydrogenated sample, sample A, was not measured for its Solid Fat Index. As the abscissa of the curve is given in degrees Fahrenheit, the respective Solids Fat Index are also given in degrees Fahrenheit.

| B. | Partially Hydrogenated Soybean Oil | | |
|---|---|---|---|
| | SFI @ 10.0° C. | (50.0° F.) = | 17.5 |
| | SFI @ 21.1° C. | (70.0° F.) = | 8.6 |
| | SFI @ 33.3° C. | (92.0° F.) = | 1.9 |
| | SFI @ 40.0° C. | (104.0° F.) = | 1.1 |
| C. | Partially Hydrogenated Soybean Oil | | |
| | SFI @ 10.0° C. | (50.0° F.) = | 31.5 |
| | SFI @ 21.1° C. | (70.0° F.) = | 19.9 |
| | SFI @ 33.3° C. | (92.0° F.) = | 6.9 |
| | SFI @ 40.0° C. | (104.0° F.) = | 0.6 |

The first three Solid Fat Indices (at the lower temperatures) for each of these oils form near linear slopes, and the plastic quality for each oil sample is likewise described. Hence, the slope formed by connecting the lower temperature SFI points is a valid indicator of its plastic characteristics. In like manner, the left side of a preferred (or target) viscosity-temperature curve is also analogous to the Solid Fat Index since it also produces a linear slope which is repeatable; thus, the left side of the viscosity-temperature curves (to the left of the crystallization zone) is a useful gage in the prediction of the Solid Fat Index of processing oil in a continuous hydrogenation reaction.

Another method was also used to confirm the plastic characteristics of the oils. That is, the intensity of high frequency energy attenuation by the oil was measured as the oil's temperature was altered to change its crystallization condition. Four samples of oil were measured by the prior art preferred technique, and as the abscissa of the respective curves is given in degrees Fahrenheit, the Solid Fats Index is also indicated in degrees Fahrenheit. The flat Curve A shows that this oil contained no crystals at these temperatures, and for this reason, this curve is flat. The following data were obtained for the other oils:

| B. | Partially Hydrogenated Soybean Oil | | |
|---|---|---|---|
| | SFI @ 10.0° C. | (40.0° F.) = | 31.5 |
| | SFI @ 21.1° C. | (70.0° F.) = | 19.9 |
| | SFI @ 33.3° C. | (92.0° F.) = | 6.9 |
| | SFI @ 40.0° C. | (104.0° F.) = | 0.6 |
| C. | Partially Hydrogenated Soybean Oil | | |
| | SFI @ 10.0° C. | (40.0° F.) = | 17.5 |
| | SFI @ 21.0° C. | (70.0° F.) = | 8.6 |
| | SFI @ 33.3° C. | (92.0° F.) = | 1.9 |
| | SFI @ 40.0° C. | (104.0° F.) = | 1.1 |
| D. | Partially Hydrogenated Soybean Oil with 20% Saturated Palm Oil | | |
| | SFI @ 10.0° C. | (40.0° F.) = | 20.6 |
| | SFI @ 21.1° C. | (70.0° F.) = | 18.0 |
| | SFI @ 33.3° C. | (92.0° F.) = | 13.5 |
| | SFI @ 40.0° C. | (104.0° F.) = | 7.5 |

Figure 11A:
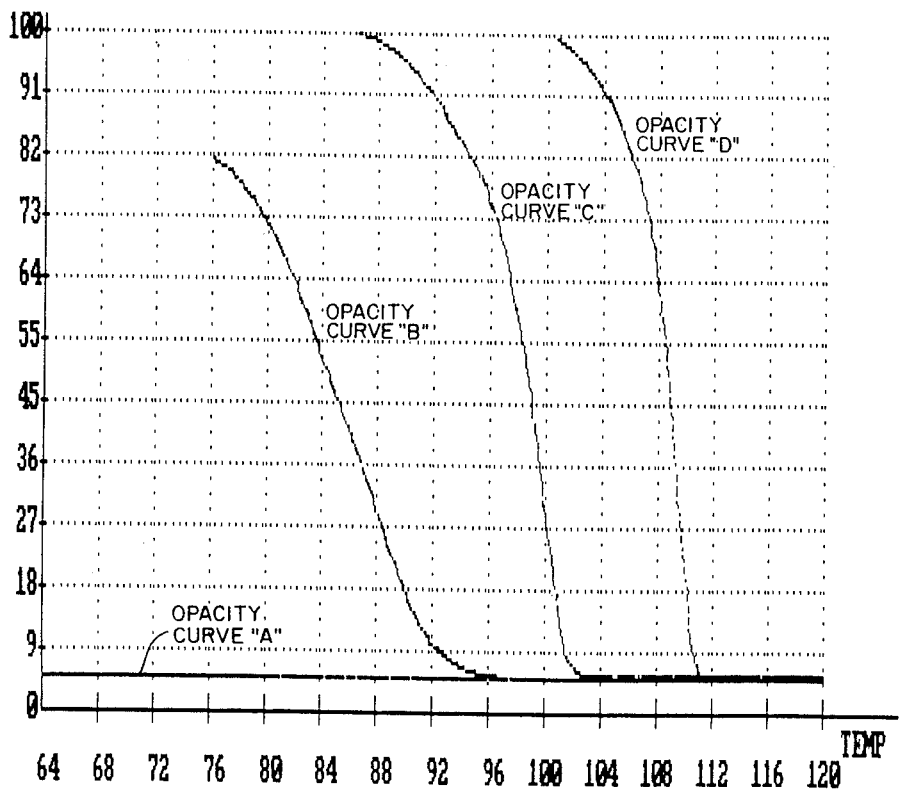
FIG. 11A is a photographic display of actual opacity and temperature data obtained.

FIG. 11A is a photographic reproduction of a computer screen printout showing the display of the computed opacity temperature data obtained when these oil samples were circulated through the equipment described above. FIG. 11A shows opacity Curves A, B, C and D corresponding, respectively, to the oil samples listed above. (The Curves A, B, and C appearing in FIGS. 11 and 11A were generated at the same time for each of these figures; that is, the oil run which generated Curve A in FIG. 11 also generated Curve A in FIG. 11A, etc.) These designations also correspond to those similarly designated viscosity curves in FIG. 11. The opacity-temperatures curves indicate that the ending temperatures have unique end points as well as good linearity corresponding to the curves plotted on FIG. 11. As FIG. 11 shows that the most plastic material is defined by the steepest curve slope (the zone to the left in FIG. 11), FIG. 11A shows the most plastic condition is defined by the steepest curve. Also, it will be noted that the curves designated as Curve C in both FIGS. 11 and 11A show that the more plastic the oil, the higher its melting temperature. Melting temperature, as used herein, has a new meaning from previous standards, as the opacity-temperature curve of the present invention accounts for the time of melting under a controlled condition.

The above description of example data is provided herein to give the reader a graphic visualization of the data presentation which is be available to a plant operator of the improved hydrogenation process and equipment presented herein. That is, the plant operator, viewing a computer screen (or printout as desired) literally views a graphic display of the quality characteristics of the processing oil at every hydrogenator vessel, and the operator is enabled to adjust various process parameters to selectively alter the working curve of the processing oil at each hydrogenator vessel so as to achieve a desired end product, that is, an oil effluent of specified unsaturation and plasticity characteristics.

Continuing now with the process schematic of FIGS. 1 and 1A, a description of the catalyst treatment will now be provided with reference to FIG. 12. Depicted therein are the catalyst storage and feeder station 52 and the oil-catalyst separator station 56, which are interconnected as depicted. Most specifically, the catalyst storage and feeder station 52 comprises the following:

260 is a new catalyst slurry storage tank;
262 is a recycle catalyst storage tank;

264 is an agitator assembly, one each of which is found in the storage tank 260 and the storage tank 262

266 is a powered agitator member, one each of which is found connected to the agitator assembly 264 in the storage tanks 260 and 262;

268 is a conduit which feeds new catalyst slurry to the new catalyst slurry storage tank 260;

270 is a conduit which feeds recycle catalyst slurry from the oil-catalyst separator station 56 to the recycle catalyst storage tank 262;

272 is a metering pump;

274 is a conduit which interconnects the bottom of the storage tank 260 to the suction port of the metering pump 272;

276 is another metering pump;

278 is a conduit connecting the bottom of the storage tank 262 to the suction port of the metering pump 276;

280 is a nitrogen conduit connected to the tops of both of the storage tanks 260 and 262; and 282 is a nitrogen bleed off conduit which communicates with the nitrogen conduit 280.

In practice, the designated new catalyst slurry storage tank 260 will actually be a battery of such tanks that are appropriately piped in parallel interconnection which permits continuous service of mixed catalyst slurry flow to the first hydrogenation; while one filter in station 56 is being back-flushed, the other is removing catalyst from the process flow. This will also be the case for the recycle catalyst storage tank 262; however, for purpose of this teaching, it will be sufficient to deal with these as individual storage tanks.

The storage tanks 260 and 262 are similarly constructed, and each has one of the agitator assemblies 264 connected to power the agitator member 266 disposed therein for continuous stirring contact with the oil and catalyst slurry contained in the tank. New catalyst slurry from a catalyst preparation station not shown) is fed as necessary to the storage tank 260 via the conduit 268. The dry materials used for preparation of the new catalyst slurry are presented by the procedures contained in U.S. Pat. No. 4,623,489. Recycle catalyst slurry is fed to the storage tank 262 from the oil-catalyst separator station 56 via the conduit 270. The metering pump 272 is connected to the bottom of the storage tank 260, while the metering pump 276 is connected to the bottom of the storage tank 262. These metering pumps 272 and 276 are connected via the bifurcated conduit 79 which leads to the first hydrogenator vessel 72 in the hydrogenation station 54. With the regulation of metering pumps 272 and 276, the strength of, as well as the amount of, the catalyst is controlled regardless of the condition of the recycled catalyst.

With continuous and nearly instantaneous quality monitoring of equivalents for both Iodine Value and Solid Fats Index, virtually any desired quality or set of qualities can be produced without mixtures or heterogeneous products. In the interest of maintaining oxygen free catalyst slurry, nitrogen blanketing of the catalyst slurry in each of the storage tanks 260 and 262 is effected in the upper portions thereof via the conduit 280 which is connected to a source of nitrogen (not shown). The nitrogen bleed off 282 with appropriate pressure controlled diaphragm valving assures proper pressuring and purity of the gas blanketing with changing slurry levels in the storage tanks 260 and 262.

In the interest of linking the teaching of the present patent with its preceding U.S. Patent Applications, the following discussion is offered. U.S. Pat. No. 4,613,410 provides essentially a dynamic method for making vapor separation in refining certain hydrocarbons. That refinement method includes the removal of all organic molecules which are smaller and have a lower vapor pressure under like conditions than the parent triglyceride. It also includes the refinement of other materials such as water and dissolves oxygen or other forms of oxygen such as the hydroxide ion. Such materials have a propensity to form peroxides and hydroperoxides at the double bonds of an unsaturated triglyceride, and such reactions go to fast completion at higher temperatures. The conventional methods for the refinement and hydrogenation of edible oils leave these materials present in a temperature progression which allows it to go to completion. U.S. Pat. No. 4,613,410, along with U.S. Pat. No. 4,623,489, not only removes the available dissolved oxygen in the precipitate form of sodium sulfate in the degumming water, but completely removes any residual water in the oil by making its dynamic vapor separation. Hence, the methods of these two applications have a synergistic effect of completely changing the conventional methods so that heretofore limitations are eliminated.

To fully understand the above, the conventional methods should be considered. Prior art refining methods utilize the temperature gradient to conserve the heat added and removed from the process line. Hence, the sequence of refining is at the convenience of the appropriate temperature rather than the most appropriate quality of refinement. Thus, in the prior art, hydrogenation is conducted not at the most quality advantageous position, but at the most temperature advantageous position, and the prior art methods suffer from unnecessary catalyst contamination. With the combined teachings of U.S. Pat. No. 4,613,410 and U.S. Pat. No. 4,623,489, this condition is circumvented; longer catalyst life and more uniform catalyst strength control are achieved.

To summarize the effects of the synergism of the combination of the present patent with the teachings of its preceding applications: all water is eliminated from the process after the degumming isothermal station; and, ancillary materials are degassed so that auto-oxidation no longer exists, thereby eliminating the need of added anti-oxydant. Thus, the process is fully protected from subsequent contamination. Since high temperatures of the conventional method are not now needed, the distillation system may be conducted at temperatures well below the natural triglyceride pyrolysis temperature.

Accordingly, while the present invention can be practiced with conventional new oil and catalyst slurry preparation, it is highly desirable that the teachings of the above mentioned U.S. Patents be utilized herewith. While U.S. Pat. No. 4,613,410 has been adequately discussed hereinabove, a summary of the invention disclosed in U.S. Pat. No. 4,623,489 may be helpful at this point to understand its incorporation herein by reference. As the actual inclusion of that disclosure herein would unnecessarily increase the length of the present disclosure, it is intended that such incorporation by reference fulfill all requirements for proper foundationing of claims due in combining the teaching thereof with the present disclosure.

It is known that newly extracted edible oils contain dissolved oxygen. Subsequent refining of the oil causes the dissolved oxygen to chemically combine with triglycerides, leading to the phenomenon called autooxidation. This is commonly called "rancidity" as the oil turns rancid, having unacceptable tastes and odors. The continuous refining and deodorization method, of U.S Pat. No. 4,613,410 offered protection from contamination by atmospheric oxygen coming in contact with the oil at elevated temperatures, but that process did not protect the oil from oxygen reaction from dissolved oxygen in the oil itself or from oxygen in any ancillary process materials which may contain dissolved or gaseous films of oxygen.

My U.S. Pat. No. 4,623,489 provided for the removal of dissolved oxygen using a single medium, deaerated water, with the resultant simultaneous removal of natural antioxidants and phosphatides. Degumming is achieved by first putting water soluble lecithins and cephalins into solution with water, and then by centrifuging the two materials from each other. Briefly, the first step is an initial acid water wash. The water used for this purpose is first sodium zeolite softened to protect the deaerating equipment from water mineral deposits. Phosphoric acid, or another acceptable acid, is mixed with the water prior to deaerating, and the mixture is flowed through an acid-water to acid-water heat exchanger.

The acid-water is then deaerated in a deaerating heater to which is supplied a source of saturated steam. The deaerated acid-water mixture is cooled to a temperature for degumming the oil, such temperature determined by the viscosity of the oil. The oil-water mixture cannot become too cool as the viscosity will become too high and the dynamic shear will cause a power loss. The raw oil does not become rancid in the presence of phosphatides and tercopherols, however, once these materials are removed in a degumming operation, oxygen reaction begins in its initial period (the induction period), after which the oil rapidly becomes rancid. Water, at normal temperatures, has a saturation of 7 to 8 milligrams per liter of dissolved oxygen, hence it has this potential for removing the same amount of oxygen from the oil. This simultaneous removal of phosphatides and dissolved oxygen from the oil is not only unique, but it is extremely useful as a refining method of edible oils. This method is applied in a series of acid water washes using phosphoric acid. Finally, all equipment is shielded from atmospheric oxygen by closed containers and nitrogen shielding.

The second part of U.S. Pat. No. 4,623,489 deals with materials ancillary to the process which contain dissolved oxygen or gaseous films of oxygen, such as clays used in the bleaching process. Catalysts used in the hydrogenation process are also gas film carriers of oxygen into the process. Dry materials, such as Kaoin clays used in bleaching as well as hydrogenation catalysts are finely divided materials which perform properly in fluidized bed equipment. A series of purges of the clay or the catalyst placed in the fluidized bed container is effected via nitrogen gas percolation. The charge of clay or catalyst is then vacuum degassed. This nitrogen gas purge and vacuum degassing are repeated until the particles are substantially free of oxygen. The fluidized bed is finally purged with fluorene gas which completely absorbs the final traces of oxygen. The spent fluorene gas is water scrubbed, and a by-product of hydrofluoric acid is generated. Acetylene gas is also an acceptable absorbent for the residual oxygen, however, the temperature must be kept low at the point of acetylene gas application. Carbon monoxide gas is also a suitable absorbing gas. Once oxygen free, the deaerated clay or catalyst is once again fluidized with nitrogen and pumped to a nitrogen shielded storage container from which application is made to the process.

The above partial description of the preparation of the edible oil for prevention of auto-oxidation, as more fully disclosed in U.S. Pat. No. 4,623,489, is provided to emphasize the oxygen free condition of the edible oil and catalyst slurry used in the present process. The effects of catalyst poisoning will be generally less for continuous hydrogenation, so timely replacement of catalyst is not a significant cost factor. In addition to that just described for oxygen removal, the present invention enjoys the further advantage of receiving its feed stock oil refined and deodorized by the process of U.S. Pat. No. 4,613,410; mention of this is made to point out that this further protects the strength of the catalyst. With such care of the feed stock oil and catalyst, the process is made to be catalyst sensitive such that changes in the catalyst strength are immediately reflected in the family of curves of the product quality measurements (viscosity-temperature and opacity-temperature curves) described hereinabove, thereby making the catalyst a control parameter which the plant operator can adjust to any catalyst strength and thus effect any desired product quality.

Returning to FIG. 12, it will be noted that the schematic of the oil-catalyst separator station 56 comprises the following:

284 is a initial spiral wound filter apparatus;

286 is a secondary leaf filter apparatus;

288 is a secondary leaf filter pump;

290 is a filter recirculating pump associated with the regeneration of filter apparatus 284;

292 is a filter recirculating pump which communicates a small side flow between the secondary filter apparatus 286 to the initial filter apparatus 284;

294 is a back pressure diaphragm valve in conduit 270 which supplies net suction pressure to pump 290 for the purpose of recirculation through the spiral wound filter tubes in vessel 284; hence the flow provided by pump 292 just matches the flow upstream of valve 294 in the conduit 270 which communicates between the bottom of the filter apparatus 284 to the recycle catalyst storage tank 262;

296 and 298 are recirculating conduits which connect the conduit 270 to the suction port of pump 290 and the discharge port of pump 290 to the conduit 24, respectively. The conduit 24 connects the output oil and catalyst slurry from the last hydrogenator vessel 72 to the top of the filter apparatus 284;

300 is a valve in the conduit 298 which isolates the reflux flow through the filter 284;

302 is a conduit which connects the conduit 24 (the output line from the filter apparatus 286) to the suction port of the pump 292 which flows the small reflux flow used for regenerating filter 284. Conduit 24 delivers finished oil from the filter apparatus 286 and passes same to the deodorizer station 60 as shown in FIG. 1A;

304 is a conduit connected to the discharge port of pump 292 and bifurcates into conduits 304A and 304 which lead to the conduit 24 and to a middle section of the second filter apparatus 284, respectively;

306A and 306B are valves in the conduits 304A and 304B, respectively;

308 is a backpressure diaphragm valve in the outlet oil stream conduit 24;

310 and 312 are conduits which interconnect the shell side of the filter apparatus 284 to the suction of the pump 288 and the discharge thereof to the filter apparatus 286, respectively; and 314 is a valve in the conduit 310.

In practice, the initial catalyst filter apparatus 284 is actually a battery of such filters that are appropriately piped in parallel interconnection which permits a set of filters to be regenerated while the alternate set is providing continuous service. However, for purpose of this teaching, it will be sufficient to deal with these as individual filters.

The initial filter apparatus 284 is a self-cleaning filter such as manufactured by the Industrial Company of Cicero, Ill., and serves as the primary slurry filter. The oil containing the suspension of catalyst is passed through porous tubes (not shown) under pressure, thusly leaving almost all of the catalyst as filtrate upon the internal surfaces of the filter tubes. The oil flow passes from the shell of filter 284 via conduit 310, pump 288 and conduit 312 to the secondary filter apparatus 286.

The secondary filter apparatus 286 is a conventional leaf filter which removes any trace of catalyst from the finished oil and passes same to the outlet oil stream conduit 24. The amount of catalyst captured on the filter apparatus 286 is small and is not returned to the catalyst storage and feeder station 52.

In operation, the bypassing provided by the conduit 296, pump 290 and conduit 298 is utilized as required to maintain a sufficient tube velocity to keep slurry traveling at a fairly high velocity through the internal tubes for thorough cleaning during regeneration of the filter apparatus 284. The recycled shell side oil flow effected via conduit 302, pump 292 and conduit 304B serves to clear the shell side of the tubes in the filter apparatus 284, while the flow through conduit 304A serves to provide dilution oil to the tube side as required. An oil reduced slurry is removed from the filter apparatus 284 via the conduit 270 and passed thereby to the recycle catalyst storage tank 262 of the catalyst storage and feeder station 52.

As the catalyst slurry to the head of the hydrogenation vessels 72 is a metered mixture from both the storage tank 262 (recycled catalyst) and the storage tank 260 (new catalyst), each of which is metered, via the inlet catalyst conduit 79; the recycled catalyst is continuously being made up with new catalyst slurry for the purpose of maintaining any desired catalyst strength for the current process. As can be seen there is a redundancy of old catalyst slurry so that a portion is discharged during each regeneration to make volume for the new catalyst additions.

Returning to FIG. 1A, the oil exiting the oil-catalyst separator station 56 via the conduit 24 is passed to the deodorizer station 60 which is similar in construction detail to the isothermal station 18 of FIG. 1. As pointed out hereinabove, the deodorization isothermal station 18 is taught in U.S. Pat. No. 4,613,410 and need not be described again here. Rather, it is sufficient to note that the deodorizer station 60 can usually be downsized to that of the earlier taught isothermal station 18 since final polishing is now the object.

Following the deodorizer station 60, the finished product stream 62 is passed through heat exchanger 58 (in heat exchange relation to the oil stream 24 exiting from the oil-catalyst separator station 56) and then through heat exchanger 50 (in heat exchange with the oil stream 24 leading to the hydrogenation station 54). The overall process depicted in FIGS. 1 and 1A is very efficient with regard to energy utilization due to the inner disposition of the noted heat exchangers between the processed stations. This is made possible by using continuous and uniform flow through the process.

It is clear that the present invention is well adapted to carry out the objects and to attain the ends and advantages mentioned as well as those inherent therein. While a presently preferred embodiment has been described for purposes of this disclosure, numerous changes may be made which will readily suggest themselves to those skilled in the art and which are encompassed within the spirit of the invention disclosed and as defined in the appended claims.

What is claimed is:

1. A hydrogenation process which controls the hydrogenation quality of an oil stream continuously in a hydrogenation reaction, the hydrogenation process comprising:

(a) passing a stream of oil and catalyst through a hydrogenation vessel having a hydrogen environment, the hydrogenation vessel comprising:

at least one rotatable shelf tray extending generally horizontally;

at least one stationary tray extending generally horizontally in substantially parallel and spaced apart relationship to the rotatable shelf trays;

support means for supporting the rotatable shelf trays and the stationary trays;

rotating means for rotating the rotatable shelf trays, the rotatable shelf trays and the stationary trays disposed to permit fluid passage respectively at a column wall of the hydrogenation vessel and at the support means so that the inlet oil and catalyst stream is caused to pass in spaces between the rotatable shelf trays and the stationary trays;

agitator paddle means supported by the shelf trays and by the stationary trays for dynamically shearing the oil and catalyst stream passing between adjacent trays in turbulent mixing thereof; and sparger means for dispersing the hydrogen gas into the stream oil and catalyst passing through the vessel;

(b) passing an oil sample through a plurality of calibrated interstices at a predetermined flow rate;

(c) cooling the oil sample to a predetermined and discrete temperature between each of the calibrated interstices;

(d) measuring the pressure drop across each of the calibrated interstices;

(e) calculating the viscosity of the oil sample according to the relationship of differential pressure divided by flow rate for each interstice;

(f) preparing a viscosity operating curve of the calculated viscosities versus mean temperatures of the calibrated interstices;

(g) comparing the viscosity operating curve obtained for the oil sample to selected viscosity reference curves prepared by conducting steps (b) through (f) above with oil of known hydrogenation; and (h) altering the process to effect a change in the hydrogenation reaction of the oil and hydrogen when the viscosity operating curve is beyond a predetermined range of separation from the selected viscosity reference curve; and (i) repeating steps (e) through (h) as necessary to continuously achieve the degree of hydrogenation desired in the oil exiting the hydrogenation vessel.

2. The hydrogenation process of claim 1 further comprising:
(j) passing another oil sample through a plurality of opacity monitors at a predetermined flow rate;
(k) changing the temperature of the oil sample of step (j) to effect a different discreet mean temperature of the oil sample in each of the opacity monitors;
(l) passing high frequency radiation through the oil sample in each of the opacity monitors;
(m) measuring the attenuation of high frequency radiation in each of the opacity monitors;
(n) preparing an opacity operating curve of the mean temperatures versus attenuation measurements for the opacity monitors; and
(o) comparing the opacity operating curve of step (n) to selected opacity reference curves prepared by conducting steps (j) through (n) above with standardized oil samples of known plasticity;
(p) altering at least one process parameter in the hydrogenation reaction of the oil and hydrogen when the opacity operating curve generated from steps (j) through (n) is beyond a predetermined range of separation from the selected opacity reference curve; and
(q) repeating steps (j) through (p) as necessary to continuously achieve the degree of plasticity desired for the oil exiting the hydrogenation vessel.

3. The hydrogenation process of claim 2 wherein step (k) involves lowering the temperature of the oil sample between the opacity monitors so that the opacity operating curve of step (o) is a temperature decaying curve.

4. The hydrogenation process of claim 2 wherein step (k) involves raising the temperature of the oil sample between the opacity monitors so that the opacity operating curve of step (o) is a temperature increasing curve.

5. The hydrogenation process of claim 4 further comprising the steps of:
(r) passing the same oil sample through a plurality of other opacity monitors;
(s) lowering the temperature of the opacity sample to effect a different and discreet mean temperature of the opacity sample in each of the other opacity monitors;
(t) subjecting the opacity sample to high frequency radiation in each of the other opacity monitors;
(u) measuring the attenuation of high frequency radiation in each of the other opacity monitors;
(v) preparing a second opacity sample curve of the mean temperature and attenuation measurements for the other opacity monitors; and
(w) preparing a second working opacity curve by integrating the first and second opacity sample curves for use in the comparison of step (n).

6. The hydrogenation process of claim 5 wherein the viscosity reference curves used in step (g) are prepared by determining the Iodine Values of samples of oil having varying degrees of hydrogenation.

7. The hydrogenation process of claim 6 wherein the opacity reference curves used in step (o) are prepared by determining the Solid Fat Index of samples of oil having varying degrees of crystal solidification.

8. The hydrogenation process of claim 7 further comprises:
filtering the portions of oil samples to remove substantially all of the catalyst prior to passing same through the interstices and opacity monitors.

9. The hydrogenation process of claim 8 wherein the hydrogenation vessel further comprises:
cooling means supported on each stationary tray for passing a selected coolant in heat exchange relationship to the processing oil and catalyst stream passing thereby.

10. The method of claim 9 wherein the sparger means comprises:
an inlet hydrogen conduit; and
at least one hydrogen nozzle sparger connected to the hydrogen conduit and having a sparger nozzle assembly comprising:
a body portion; and
at least one capillarly tube extensive from the body portion and having a capillary bore extending the length thereof and communicating with the inlet hydrogen conduit to disperse hydrogen gas passed therethrough.

11. The method of claim 10 wherein the hydrogen sparger further comprises:
vibrator means for vibrating the sparging nozzle assembly so that dispensing hydrogen bubbles are reduced in size.

* * * * *

UNITED STATES PATENT AND TRADEMARK OFFICE
CERTIFICATE OF CORRECTION

PATENT NO. : 4,973,430

DATED : November 27, 1990

INVENTOR(S) : Jacob B. Rivers, Jr.

It is certified that error appears in the above-identified patent and that said Letters Patent is hereby corrected as shown below:

Column 1, line 23, delete "articularly" and substitute therefor --particularly--;

Column 7, line 36, delete "wa" and substitute --way-- therefor;

Column 14, line 23, after "is" and before "the" insert --shown in partial cutaway view to reveal a portion of--;

Column 16, line 3, delete "he" and substitute therefor --the--;

Column 19, line 4, delete "series" and substitute --serves-- therefor;

Column 21, lines 46 and 47, delete "desiqnated" and substitute --designated-- therefor;

Column 24, line 57, after "then" insert --,--;

Column 25, line 66, after "108" insert --,--;

Column 26, line 13, delete "passe" and substitute therefor --passed--;

Column 27, line 49, delete "values" and substitute --Values-- therefor;

Column 30, line 22, delete "opacity" and substitute therefor --opacity- --;

UNITED STATES PATENT AND TRADEMARK OFFICE
CERTIFICATE OF CORRECTION

PATENT NO. : 4,973,430
DATED : November 27, 1990
INVENTOR(S) : Jacob B. Rivers, Jr.

It is certified that error appears in the above-identified patent and that said Letters Patent is hereby corrected as shown below:

Column 30, line 61, delete "IA" and substitute --1A-- therefor;

Column 31, line 37, delete "not shown)" and substitute --(not shown)-- therefor;

Column 33, line 52, delete "Kaoin" and substitute --Kaolin-- therefor; and

Column 34, line 60, delete "and 304" and substitute --and 304B-- therefor;

Column 7, line 33, delete "stardardized" and substitute --standardized-- therefor;

Column 10, lines 24, 26 and 36, before "hydrogen" delete "an" and substitute therefor --a--;

Column 12, lines 19 and 20, delete "deordorizing" and substitute therefor --deodorizing--;

Column 23, line 66, delete "infra red" and substitute therefor --infrared--;

Column 24, line 13, delete "infra red" and substitute therefor --infrared--;

Column 30, line 49, after "is" and before "available" delete "be"; and

UNITED STATES PATENT AND TRADEMARK OFFICE
CERTIFICATE OF CORRECTION

PATENT NO. : 4,973,430
DATED : November 27, 1990
INVENTOR(S) : Jacob B. Rivers, Jr.

It is certified that error appears in the above-identified patent and that said Letters Patent is hereby corrected as shown below:

Column 36, line 44, delete "stream oil" and substitute therefor --stream of oil--.

Signed and Sealed this

Ninth Day of June, 1992

Attest:

DOUGLAS B. COMER

*Attesting Officer*  Acting Commissioner of Patents and Trademarks